April 16, 1940. E. R. BURTNETT 2,197,536
TRANSMISSION MECHANISM
Filed April 11, 1938 2 Sheets-Sheet 1
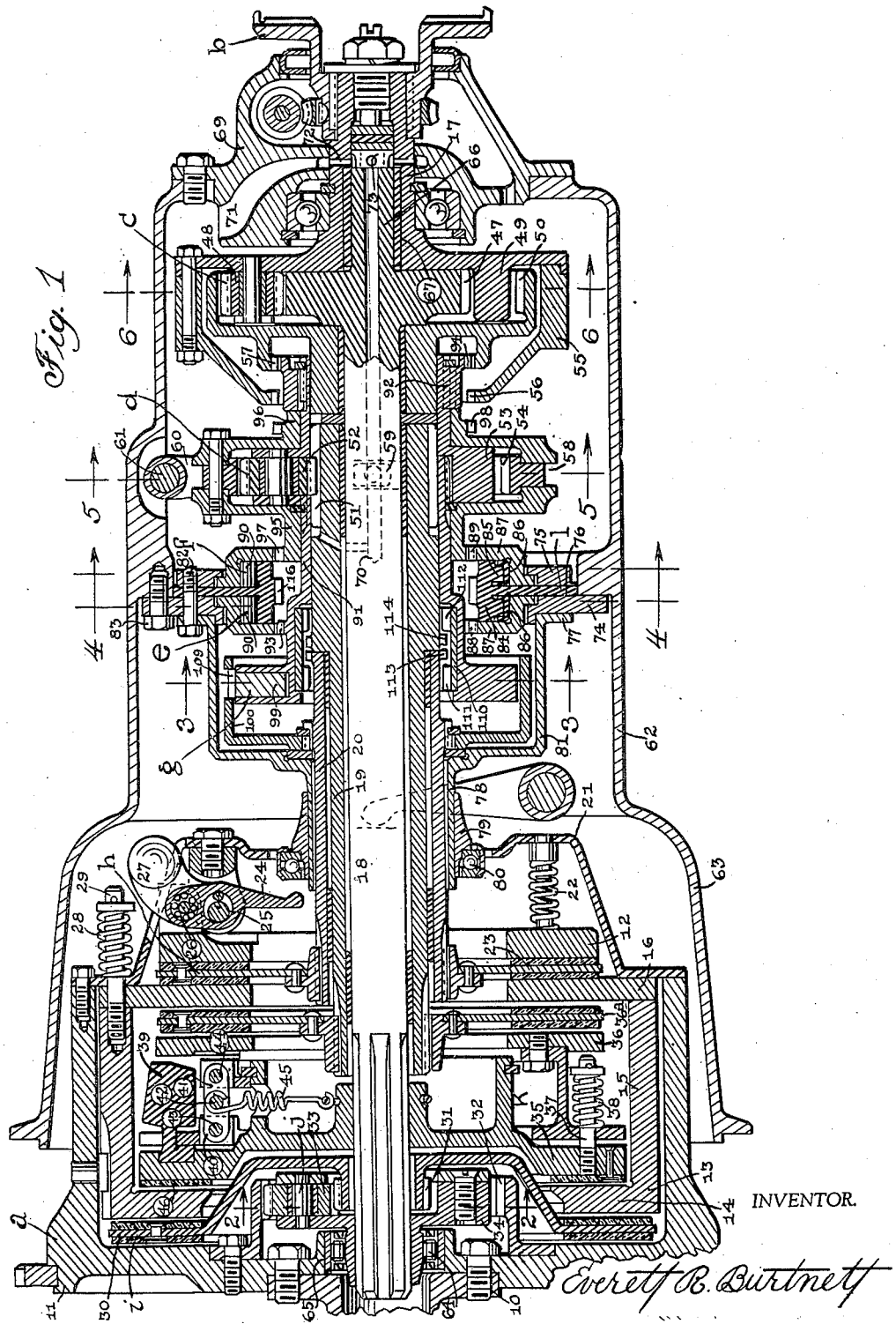
INVENTOR.
Everett R. Burtnett April 16, 1940.   E. R. BURTNETT   2,197,536
TRANSMISSION MECHANISM
Filed April 11, 1938   2 Sheets-Sheet 2
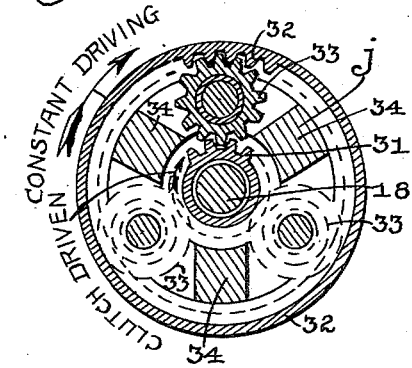
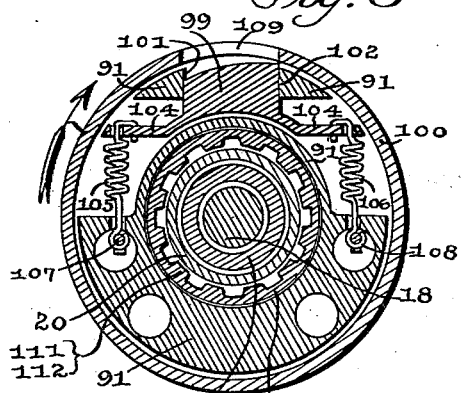
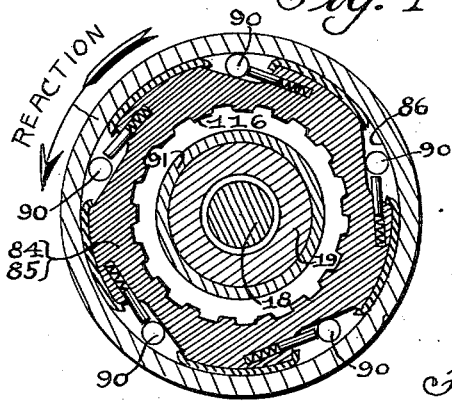
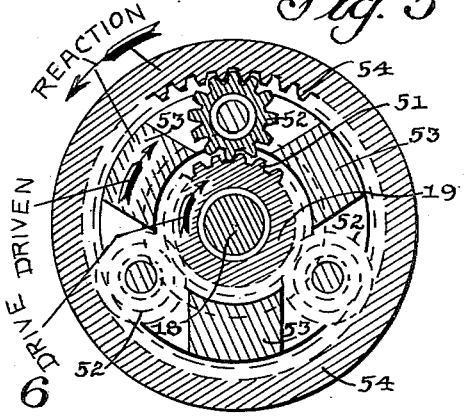
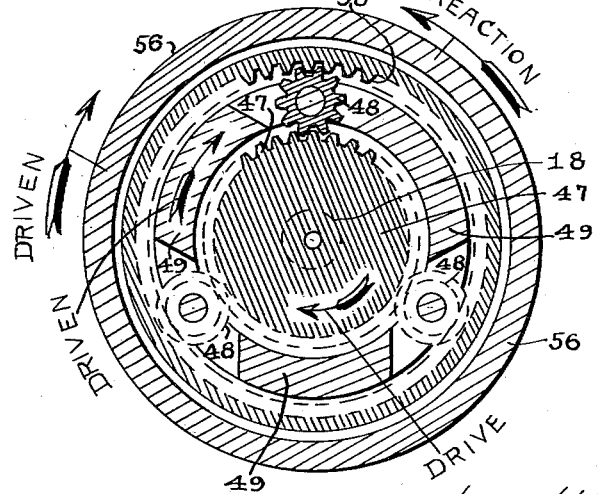
INVENTOR.
Everett R. Burtnett Patented Apr. 16, 1940

2,197,536

UNITED STATES PATENT OFFICE 2,197,536

TRANSMISSION MECHANISM

Everett R. Burtnett, Los Angeles, Calif., assignor of one-half to Edith Glynn Burtnett, Los Angeles, Calif.

Application April 11, 1938, Serial No. 201,294

48 Claims. (Cl. 74—260)

The present invention relates to power transmission devices, and more particularly to a change speed transmission for use in automotive vehicles such as passenger cars, busses, trucks and the like, and is principally concerned with transmission provisions for automatically and continuously varying the speed and the torque ratio between a prime mover driven driving member and a load propelling driven member, particularly of a vehicle, during its acceleration from a standing start and with provisions for optionally causing the automatic control to relinquish high speed ratio transmission establishment downward to a relatively higher torque ratio speed when such varying conditions to which the vehicle is subjected and at which a higher torque ratio would be advantageous are encountered.

In providing an automatic change speed transmission for the above outlined uses, the centrifugal principle of means for automatically accomplishing the change of speeds has, for the reasons of its mechanical nature and comparative simplicity, warranted its preference. However, for initially automatically connecting the transmission to start the load at a given speed ratio, giving an advantageous torque multiplication, and for successively automatically accomplishing a change to a higher speed ratio when the load has been accelerated to a point under which condition a lessened torque multiplication would be advantageous, and for accomplishing this change without requiring an interruption in the drive, requires that the centrifugal clutches be of the friction type. It is important to the obtaining of desired fleetness in vehicle acceleration performance that the first change of speed upward at least be of the nature providing uninterrupted flow of power to maintain the load under acceleration. A friction clutch giving a slight degree of slip meets these requirements but heretofore has presented the problem of minimizing the slip while initially taking on the load and while changing the transmission to a next higher-speed ratio of drive, both under power. Accordingly, the present invention has for one object the provision of an initial transmission connecting coupling unit comprising a normally drive connected mechanical train for flow of power advantageously constituting a planetary gear train having a gear element of highest pitch line velocity in permanent connection to be driven by the source of power; and a first centrifugal automatic friction type clutch mechanism to drive another gear element of this planetary gear train that is adapted to be directly driven and having the lowest pitch line velocity. The centrifugal clutch mechanism for cooperation with the source of power whereby, when engaged, the transmission circuit of this planetary gear unit is closed such that the centrifugal clutch-rendered connection with the source of power is required to carry but a small ratio of the power transmitted through the combined planetary gear and friction clutch drive coupling. This first described novel provision is contemplated in the obtaining of satisfactory centrifugal automatic friction type clutch control over the initial drive coupling of the power to start the load, so as to reduce the duty and the slip ratio of the centrifugal clutch to this end to a minimum substantially under the degree of slippage that the conventional manually controlled motor vehicle clutch is subjected, especially at the hands of the average driver.

Assuming the provision of three forward speeds for progressive variance of torque to afford a fast getaway from a standing start to a touring speed, namely first, second and high (the latter preferably a direct drive). The automatic change from the first to the second speed should take place under average conditions somewhere around 15 M. P. Hr., if the rate of vehicle acceleration is to be continued further at the most advantageous engine speed to that end. However, at this comparatively low vehicle speed attainment in the scheme of acceleration, an interruption of the power even for a few seconds would reduce the mean ratio of acceleration appreciably. The desired provision therefore is for a successive centrifugal automatic clutch engagement to take place under full power or any degree of full power at the speed attainment of the vehicle at substantially 15 M. P. Hr. which will change the transmission from the first speed to the second speed, incurring no interruption in acceleration of the vehicle. Because a simple centrifugal clutch operates gradually in accordance with increasing speed to overcome its retractive spring element, therefore tending to a long slip period, an adaptation of a centrifugal automatic friction clutch to accomplish a speed ratio transition upward without interruption of torque presents an even greater slip tendency. The requirement for a practical speed responsive automatic friction clutch engagement to accomplish a speed transition in transmission upward is obviously for some sub-means cooperative with a successively engaging friction type centrifugal automatic clutch which will operate to reduce its slip period and also appreciably reduce the ratio of the power transmitted for the higher speed ratio by a given friction element. To this end, the present invention has for a further object and contemplation the provision first, of a second centrifugal automatic friction type clutch mechanism to accumulatively engage, with respect to the load-starting first engaging centrifugal automatic clutch unit, and incorporating a novel sub-centrifugal control whereby this second engaging centrifugal clutch is positively restrained from moving toward engagement in response to its gradually increasing speed until a speed of rotation has been reached, concurrent with the vehicle having attained the aforesaid exemplary 15 M. P. Hr. under acceleration, and at which the second centrifugal clutch has built up sufficient centrifugal force to reach a positive state of engagement almost instantly upon being released from said restraint; and second, of providing a transmission gearing to give the second speed ratio of drive (preferably of the plurality planetary gear unit in series type) whereby this first speed change, effected by a secondly engaging centrifugal clutch unit, is such that the latter merely shares the load of the thus established second speed ratio with the load starting firstly engaged centrifugal automatic clutch unit. This constitutes a leading spirit of the present invention, to wit: To provide for multiplying coupling devices by each succeeding relatively higher speed ratio of transmission transition, whereby the power transmitted by a respective friction coupling is substantially proportionately lessened by accumulatively engaging friction coupling operations to raise the speed ratio.

In connection with later automatically accomplishing a change from the second speed to high speed, also by centrifugal automatic means, it is desirable to depart from solely predetermined speed attainment automatic control so that the driver may have control as to when or at what vehicle speed the transmission transition of the high speed will take place. In view of the comparatively high vehicle momentum and high engine torque values at the vehicle speeds at which the change from second to high speeds would most advantageously take place, it will be obvious that a momentary interruption of the flow of power in connection with accomplishing a transition from second to high speed will not be disadvantageous, but will, as a medium of controlling the change to high at different vehicle speed attainments, be very advantageous. Accordingly, the present invention has for a still further object and as a further contemplation, the provision of a positive type centrifugal automatic clutch mechanism for accomplishing the change from second to high speed ratios. Such a clutch adaptation would advantageously be operable only above a predetermined speed of rotation attainment corresponding to an exemplary 25 M. P. Hr. vehicle speed under drive of the second speed, and then only upon a certain pair of associated power transmitting members reaching synchronization of rotation. This adaptation embraces a centrifugal automatic clutch having the characteristics of becoming operable incident to results of a momentary deceleration of the driving train and a resultant reverse of torque in the transmission. This type of centrifugal automatic clutch meets the desire with respect to affording the driver control over the automatic change of speed upward, that is, from the second to the high speed. Its positive engagement character and nature of depending upon a certain predetermined low vehicle speed (decelerating) being reached before it will open to subsequently revert the drive downward to a lower speed ratio, has heretofore presented the problem of providing the driver with the most advantageous means for exercising his will over the transmission operating conversely to automatically change speed downward without decelerating the vehicle to where the high speed ratio centrifugal clutch would normally open, and more especially, without requiring a momentary cessation of torque. Accordingly, the present invention has as a still further object and further contemplates the provision of variable speed transmission incorporating multi-speed transmitting gearing (preferably planetary type) which will afford the aforementioned synchronization of parts; the provision of a positive type centrifugal automatic clutch mechanism coordinated with such gearing so as to establish same operative to give a high speed ratio of drive upon the synchronization of speed of the associate parts occurring incident to a momentary deceleration of the driving train and the consequent reverse of torque taking place; the provision of a plurality centrifugal automatic drive coupling means for establishing firstly a first speed ratio, secondly, a second speed ratio, and thirdly a third speed ratio, all coordinated with the multi-speed transmitting gearing whereby the succeeding or accumulatively operating centrifugal automatic coupling unit proportionately reduces the load shared by a respective coupling unit. Also such that, if the high speed clutch normally opens or is abnormally caused to open, the gearing will assume the load at a lower speed ratio. And further, the provision of a more or less conventional spring means normally engaged friction clutch in series in the high speed ratio effective transmitting train for optional disengagement at the will of the driver and drive operatively in tandem with the positive type centrifugal automatic coupling unit that is adapted to establish the third or high speed ratio. Whereby, at any vehicle speed, under drive of the automatically established high speed, the driver may disengage the conventional clutch unit, subsequently loosen the high speed train as completed by the engaged positive type centrifugal coupling and incidentally facilitate the latter to decelerate in speed with the reaction element of the planetary gearing, until the speed of the speed responsively automatic high speed coupling is no longer sufficient to maintain same operative, thus reverting the transmission to the next-lower-speed ratio of drive. And still further to provide the aforementioned coordination such that, while the optional clutch is momentarily disengaged, the power source is required to be accelerated to accomplish the deceleration of the speed responsively engaged high speed ratio established coupling whereby propulsion of the vehicle is continuous while optionally reverting the transmission downward in speed ratio of drive.

The above lastly described ability of the present invention, namely, the provision whereby the centrifugal automatic means established high speed ratio affording on the one hand driver control over the vehicle speed at which it may take place, but more particularly, whereby the automatically established high speed ratio may be disestablished, relinquishing to a lower speed higher torque drive, while the full power is maintained if desired, constitutes an important contribution to variable speed transmission and centrifugal automatic control means working arrangements. A principal object of the present invention therefore resides in this provision whereby the long desired ability to change downward in speed ratios, particularly in motor vehicles, while maintaining the load accelerating forces fully, or even partially, in effect is met. In applicant's co-pending application Ser. No. 178,301 filed December 6, 1937, somewhat similar performance characteristics are embraced, but the arrangement is for obtaining reversion downward in speed ratio by declutching a (solely speed-responsive automatic) clutch and requiring that the power source be simultaneously decelerated to obtain the automatic opening of the high speed speed-responsively automatic coupling 100 thereof.

In proposed centrifugal automatic change speed controlled transmissions, particularly those proposed for use in motor vehicles, abilities usually neglected have been those of parking the vehicle "in gear". A further object of the present invention is to provide a plurality planetary gear unit transmitting means, in which the plurality of planetary gear units are adapted to gear drive in series to give certain speed ratios of transmission, but in which one of the plurality of planetary gear units is adapted to be shifted selectively as a unit to take it out of range for series operation with other planetary gear units of the plurality. Thus, in one position the one planetary gear unit will operate singularly to give a permanent (fixed) positive low forward speed ratio drive and into another position wherein it will operate singularly to give a permanent (fixed) positive low ratio of reverse drive, and in either the fixed forward or the fixed reverse drive, whereby the automatic change speed range of transmission operation is incidentally established in neutral. In connection with these permanent (fixed) positive speed drive selectable shift abilities of certain of the plurality planetary gear unit constituency of the present invention, it is a still further object of the present invention to associate the aforementioned conventional clutch unit with same for completing the driving connections of either the selective permanent positive low forward or reverse speeds between the engine and the vehicle propelling driven member of the transmission. The provision for shifting one of the plurality provisions of planetary gear units for series operation out of this state and into other positions, respectively, to give positive forward low and reverse gears rakes for simplification in connection with providing means to these important ends, and the provision of the conventional spring engaged friction clutch unit to complete the driving connections of either of these positive gears affords not only means for locking the vehicle in gear while the engine and vehicle are at rest and the centrifugal automatic drive connecting means are operating at nil, but affords the driver the customary declutching feature with which years of practice has made him, by second nature, habitually a declutcher. In this latter respect it is a still further object of the present invention to associate this conventional normally engaged clutch unit with the centrifugal automatic clutch units, particularly the initial drive connecting first speed establishing centrifugal automatic friction clutch, such that before the vehicle has been motivated, while standing still so to speak as when awaiting a street intersection signal, the centrifugal automatic clutch mechanism may be rendered ineffectual to start the car, even though the transmission is preselected "in gear" and the engine accelerated, by declutching in the customary manner (releasing the conventional clutch unit.) This contributes greatly to safety in connection with speed responsive automatic (centrifugal) motor vehicle transmission. Especially, in that the driver may declutch as customary and race his engine, as is so often practiced, without the result of the vehicle unexpectedly lurching forward in a moment of driver forgetfulness of the speed responsive automatic character of his transmission.

In the realm of developments in what may be termed conventional motor vehicle transmissions, those wherein repeated clutch and gear shifting operations are necessitated at intervals, the three forward speed gearbox has predominated. However, principally for busses and trucks, and on several occasions for passenger cars, a fourth forward speed has been added. In some of these four forward speed transmissions the first, second and third speeds were included in a normally useable range in which the third speed was direct and the fourth made a more or less optional overdrive speed. In others, the first speed was provided to be optional for occasional use, while the second, third and fourth speeds were made to constitute the normal driving variable range. The fourth speed being direct and the vehicle started usually in second. In the division in which the fourth speed was provided as an overdrive it was usually placed in the optional use category and was preferably incorporated in connection with so-called slow-axle reductions whereby the engine-to-axle ratio could be made higher for high vehicle speed use. In the division in which the fourth speed was made direct, the first speed was usually placed in the optional use category and was preferably incorporated in connection with so-called fast-axle reductions whereby the engine-to-axle ratio could be made low enough to meet emergencies by shifting into the optional first. The present invention has for a still further object the provision and obtaining of four forward speeds from two single train planetary gear units, either for singular gear driving operation and both for series gear driving operation, respectively, to obtain three gear driving forward speed ratios, and for rotation as a unit to obtain the fourth speed as a direct drive. It is designed preferably for use in connection with the fast axle reductions and novelly affords that by declutching and shifting one of the two planetary gear units the same is rendered operatively independent of the other planetary gear unit and in fact independent of all of the automatic change speed mechanism of the transmission and is selectively established, either closing the circuit of a permanent positive first forward speed or closing the circuit of a permanent positive reverse drive connection between the engine and vehicle wheels. Accordingly the second, third and fourth speeds are assigned to the automatic range under which the vehicle will be normally driven.

A still further object of the present invention is the provision of a first friction clutch unit having the usual spring element acting to normally hold the clutch engaged but of appreciably less tension than customary. Preferably only enough spring tension to give this clutch unit a normally engaged torque capacity equal in coefficiency the torque incidental to the engine compression as a brake against the vehicle moving whereby the vehicle may be parked on a hill effectively "in gear" against the engine compression; the provision of a normally disengaged second friction clutch unit, associated with the vehicle starting speed ratio of the automatic range, and depending upon pressure from the aforementioned spring means normally engaged clutch unit for energy to engage and automatically establish the first driving connection to pick up the load; the provision of centrifugal weights for superenergizing the engagement of the spring means normally engaged clutch unit such that the latter will firstly attain a capacity that would be sufficient to transmit the torque of the engine by itself and thereafter output to supply the force to cause the automatic engagement of the second clutch unit upon and in response to the driving member to which the conventional clutch unit is associated being accelerated to a predetermined sufficient speed to effect these centrifugal weights accordingly; and to provide these centrifugal weights on the customary clutch release levers of the conventional spring means normally engaged clutch unit for remote centrifugal actuation of the second clutch unit (being the first automatic engaging clutch unit), whereby the customary declutching of the conventional clutch unit will carry the centrifugal weights retractively with the effectuating clutch release levers and preclude the normal centrifugal automatic engagement of the first or load starting clutch unit. This, aside from providing an optionally disengageable clutch unit facilitating the shifting of emergency low and reverse and parking gears, provides also a conventional clutch unit conventionally disengageably controlling with ease the centrifugal automatic engagement and disengagement of an automatic drive connecting clutch element of the automatic drive connecting and automatic change speed constituency of my improved transmission.

While I have outlined above the broad or generic purpose of the present invention, it is to be understood that other objects and advantages of the present invention will be apparent from the following detailed description, taken in conjunction with the accompanying drawings, in which:

Figure 1 is a vertical longitudinal sectional view through one structural embodiment of the present invention;

Figure 2 is a vertical transverse sectional view through the power transmission mechanism illustrated by Fig. 1 and is taken substantially on line 2—2 thereof viewed in the direction as indicated by the arrows on Fig. 1;

Figure 3 is a vertical transverse sectional view through the power transmission mechanism illustrated by Fig. 1 and is taken on line 3—3 thereof viewed in the direction as indicated by the arrows on Fig. 1;

Figure 4 is a vertical transverse sectional view taken through the power transmission mechanism illustrated by Fig. 1 and is taken on line 4—4 thereof viewed in the direction as indicated by the arrows on Fig. 1;

Figure 5 is a vertical transverse sectional view through the transmission mechanism illustrated by Fig. 1 and is taken on line 5—5 thereof viewed in the direction as indicated by the arrows on Fig. 1, and Figure 6 is a vertical transverse sectional view through the transmission mechanism illustrated by Fig. 1 and is taken on line 6—6 thereof viewed in the direction as indicated by the arrows on Fig. 1.

Referring particularly to the drawings, a driving member 10 is found preferably constituting a member driven by the vehicle engine such as the engine crankshaft and carrying a flywheel 11 nonrotatably fixed thereto.

Completing the driving member designated $a$ are driving frictionally-engaging clutch presser plates 12 and 13, the latter comprising a presser portion 14 and a laterally extending rim portion 15, and an intermediate driving frictionally-engageable clutch plate 16.

A driven shaft 17 preferably constituting a vehicle propelling driven member designated $b$ is found to embrace the output element of a variable speed intermediary transmitting mechanism having three normally independently revolvable concentric intermediary transmitting members 18, 19 and 20, respectively, serving as individual clutch shafts or distinct intermediate driven members to separately engaging friction type clutch units designated $i$, $k$ and $h$. While the variable speed intermediary transmission means is found concentrated in two epicyclic gear train type planetary gear units designated $c$ and $d$, with a separate reaction clutch unit designated $e$ of the cam and roller type cooperating exclusively with the planetary gear unit $c$, a separate reaction clutch unit designated $f$ also of the cam and roller type cooperating exclusively with the planetary gear unit $d$, and a positive type centrifugal automatic clutch unit $g$ operatively disposed between the clutch shaft 20 and the reaction train of the planetary gear unit $c$.

Forming the detailed elements of the more or less conventional friction clutch unit $h$, are a back plate or customary stamped clutch shell 40 21 to which the presser plate 12, individual to this clutch unit, is rotatably but longitudinally movably secured in the customary manner; in which unusually light springs 22 serve to normally thrust the presser plate 12 forwardly with just enough pressure to pack a driven clutch plate 23, that is individual to the clutch unit $h$, to the intermediate plate 16 so as to normally effect a clutching coefficient equal only to that of the torque of the engine compression; in which the customary clutch release levers, or sometimes called throwout fingers, 24 are fulcrumed in the usual manner at 25 to the back plate 21, with a sub-fulcrum 26 connecting the levers 24 operatively to the presser plate 12 and through which sub-fulcrum 26 a centrifugal weight portion 27 of the levers 24 operates against the main fulcrum 25 to augment the springs 22 in energizing the pressing of the presser plate 12 forwardly in response to the carrying driving member $a$ being accelerated above an engine idling speed at which the centrifugal weight 27 has little or no effect; and in which a series of springs 28, having slightly greater tension than the series of springs 22, and acting preferably through individual bolts 29, the latter threaded into apertures formed therefor in the rim portion 15 of the presser clutch member 13, operate normally to hold the intermediate plate 16 at rest rearwardly against a shoulder therefor of the back plate 21. All such that the clutch unit $h$ is normally held engaged at low pressure and the clutch unit $i$ is normally held disengaged as a result of the springs 28 having a slightly greater tension than that of the springs 22. Thereby, only the influence of the booster centrifugal weights 27, of the normally engaged but optionally disengageable clutch unit $h$, is required to overcome this differential of tension between the springs 28 and 22 and, operating through the intermediary pressure transmitting medium of the engaged clutch unit $h$, cause the intermediate plate 16 and in turn the presser member 13 to be thrust forwardly engagingly to pack a driven clutch disk 30 of the clutch unit $i$ to the flywheel 11. The latter forming the customary bottom friction driving clutch member. At this point it will be observed, that the customary use of the levers 24 to effect the disengagement of the clutch unit $h$ will also accomplish disengagement of the clutch unit $i$, provided the clutch unit $k$ has not engaged the latter, with resultant secondary thrusting of the presser member 13 forwardly independent of the intermediate plate 16.

Through the medium of the normally engaged clutch unit $h$ provided with centrifugal weights 27 and the clutch unit $h$, when thus centrifugally energized, operating to convey the centrifugal force effort to automatically cause the engagement of the clutch unit $i$, the novel means provision of the present invention for initially completing the driving connections of a low speed ratio of drive, respectively, through the planetary gear unit $c$ operating singularly to drive the driven member $b$, in response to a sufficient speed of rotation of the driving member $a$ (engine) is described save for the connecting means of the clutch disk 30 with the clutch shaft 18, which follows:

So that the first centrifugal automatic engaging clutch unit $i$ will be required to transmit but a small ratio of the power transmitted to the clutch shaft 18 and to carry the torque of starting the load on the driven member $b$ from standstill, a planetary gear unit designated $j$ is formed giving a permanently operable but normally idling mechanical connection between the engine crankshaft 10, flywheel 11, or engine driven driving member $a$ and the clutch shaft 18. This planetary gear unit $j$ forms a permanently mobilized epicyclic gear train between the driving member $a$ and the clutch shaft 18 which needs only the engagement of the clutch disk 30 also to be driven, but directly, by the driving member $a$, to close the circuit of thus combined planetary gear unit and centrifugal automatic friction clutch constituted drive coupling means between the primary driving member $a$ and the first automatic low speed driving clutch shaft 18.

Taking advantage of two different size gears of a single epicyclic gear train being employed as joint driving members thereto having characteristics of transmitting power in proportion to their pitch line velocities, this planetary gear unit $j$ preferably comprises, a sun gear 31 rotatable with the clutch disk 30, an internal gear 32 carried rotatably with the flywheel 11 (primary driving member $a$), planet gears 33 meshing with both the sun and internal gears 31 and 32 and a planet gear carrier 34 rotatable with the clutch shaft 18. Of a ratio of 3:1, the sun gear 31 and in turn the clutch disk friction element 30 would be required to transmit substantially 25% of the power while the positive internal gear 32 would transmit substantially the remaining 75% of the power delivered from the common driving member $a$ to the clutch shaft 18. This assures that the slip of the initial load starting centrifugal automatic clutch unit $i$ will be only sufficient to render a jerkless automatic completion of the load-taking driving connection, and fortifies the respective frictional-clutch-engagements against appreciable wear under repeated vehicle starts and heavy loads over long periods. While maintaining the clutch disk sizes of conventional clutches for given H. P. requirement, the facing of this centrifugal automatic clutch, through the virtue of its co-driving planetary gear train, should greatly exceed the life of the facing of conventional clutches subjected, as the latter are at present to more unskilled manual manipulations than skilled and consequently to excessive slip periods and every manner of abuse.

Having inaugurated the first speed of the automatic range through the primary drive coupling means of the planetary gear unit $j$ and its co-element clutch unit $i$, the clutch shaft 18 and the planetary gear unit $c$ operate, exclusively of the planetary gear unit $d$, to initially drive the driven member $b$ at first automatic speed. Arriving at a vehicle speed attainment of, for example, 15 M. P. Hr. under acceleration of this first automatic speed, and desiring the transmission to automatically change to the second automatic speed without incurring the slightest interruption of the power-to-the load, we turn to the second centrifugal automatic clutch unit $k$. Here is found a driven presser clutch plate 35 to which is non-rotatably but longitudinally relatively movably connected a second driven presser clutch plate 36, both reposing longitudinally between and, respectively, adjacent the driving presser clutch plate portion 14 of the member 13 of the first centrifugal automatic clutch unit I and the driving intermediate plate 16, as well as within, or encompassed by, the rim portion 15 of the driving member 13. Connecting these two driven presser plates 35 and 36 rotatable with each other but for relative longitudinal movements are bolts 37 preferably threaded into apertures formed therefor in the plate 35 and extending loosely through a portion of the plate 36. Operating to normally hold the plates 35 and 36 in utmost retracted positions toward each other are retractive springs 38 preferably encompassing the bolts 37 for the advantage of the latter as guides. To be clutch packed by the driven presser plate 36 to the intermediate driving plate 16 is a driven clutch disk 36ª. For actuating the two members 35 and 36 to move away from each other, respectively, to bring the presser clutch plate 35 into engagement with the rearward side of its thereadjacent presser plate 14 of the first centrifugal clutch unit $i$ and to thrust the presser clutch plate 36 toward and into engagement with the driven disk 36ª and to in turn pack the latter against the forward side of its thereadjacent intermediate plate 16, are master centrifugal weights 39 operatively wedged between the two driven presser plates 35 and 36. So that these presser plates 35 and 36, constituting in the main the second automatic speed clutch unit $k$, may not be moved to initiate their respective clutch functioning frictional-engagement with either the plate 14 or the disk 36ª, that is, so that no effort of this clutch unit $k$ will be made to engage until its individual centrifugal actuating weights 39 have built up a centrifugal force coefficient sufficient to substantially immediately thrust the respective clutch unit into a positive clutching state, minimizing its slip possibilities to almost nil, links 40 and 41, preferably normally disposing in a horizontal plane, are wrist pinned at 42, 43 and 44 to normally occupy a dead center toggle which operates to normally prevent the clutch presser plates 35 and 36 from moving under initial urge from the master centrifugal weights 39, but by the same pins 42, 43 and 44 the links 40 and 41 being related articulate whereby, under their own centrifugal force, concentrating about the axis of the central pin 42, they may be actuated to collapse out of their normal dead center toggle state and thus release the presser plates 35 and 36 to be immediately forcefully motivated away from each other under the accumulated centrifugal force of the master weights 39. It will be seen that these links 40 and 41 constitute a centrifugal timing device which, in conjunction with a sub-retractive spring 45 acting to constantly urge the links 40 and 41 to pull into their dead center toggle status, but yielding when the latter attain a centrifugal force coefficient of themselves greater than the tension of the spring 45, may be employed for positively restraining this second automatic speed establishing centrifugal automatic clutch unit from functioning until it has reached a speed of rotation, driven as it is by its carrying shaft 18, corresponding to the aforesaid exemplary 15 M. P. Hr. vehicle speed attainment in the first automatic speed ratio. And, at which driven speed of rotation it will have sufficient built-up centrifugal force for its immediate engagement to an effective gripping clutched state. Accordingly, when the vehicle reaches 15 M. P. Hr., the built up centrifugal force of the master weights 39 acting on the plates 35 and 36 is sub-centrifugally timed and released by the centrifugal force of the links 40 and 41, at this moment overcoming the springs 45, whereby the clutch unit k engages quickly and subsequently operates to grip the clutch disk 36ª and consequently connect the second automatic speed effective shaft 19 to rotate with the driving member a. Whereupon, supplementing the drive of the combined coupling comprising the clutch unit i and the planetary gear unit j, the shaft 19 inaugurates a drive to the other planetary gear unit d. Subsequently, the planetary unit d operates to apply its individual reaction to its respective reaction clutch unit f, and subsequently in turn, the second planetary gear unit d inaugurates its gear driving relation in series with the gear unit c. The joint, or series, gear driving operation of the two planetary gear units c and d, each under individual drive from the driving member a, results in the driven member b being driven at second automatic speed ratio instead of first automatic speed ratio relative to the speed of the driving member a.

Referring now to the detailed structure of the gearset, of the illustrated form of the present invention, the planetary gear unit c is found to include, a sun drive gear 47 rotatable with its individual clutchshaft 18 and meshing with a series of planet gears 48 respectively carried revolvable around their respective axes by a planet carrier 49, the latter formed preferably as an enlarged portion of the driven shaft 17 and thereby constituent of the driven member b, and an individual reaction or orbital acting internal gear member 50 forming an epicyclic track for the planet gears 48. Considering, in the way of example, that this planetary unit c has a sun pinion 47 to internal reaction gear 50 ratio of 1:55, the unit c operating singularly will be effective to forward drive the driven member b at a 2:55 ratio. A sun drive gear 51 rotatable with its individual clutch shaft 19 and meshing with a series of planet gears 52, the latter carried revolvable around their respective axes by an individual planet carrier 53, and an individual internal reaction gear element 54 forming an epicyclic track or orbital member for the planet gears 52.

The driven member b, or more in detail, the driven shaft 17 and the latter's enlarged portion constituting the planet carrier 49 of the planetary gear unit c is formed to have a portion 55 encompassing or drive circumventing the planetary gear unit c and terminating at a reduced diameter in internal clutch teeth 56. In a spaced longitudinal plane with the clutch teeth 56 of the driven member b is formed a like diameter of internal clutch teeth 57 of the internal gear 50 of the planetary gear unit c. The planetary gear unit d is adapted to be shifted longitudinally as a unit and to this end is provided with a groove 58 receiving the ends 59 of a bifurcated shifter crank 60 suspended for rock motion on a transverse shaft 61.

A gear case 62 houses the planetary gearing and is shown in a preferred form integral with a clutch bell housing portion 63. The clutch shaft 18 is found to extend from the usual pilot bearing 64 in the customary recessed hub 65 of the flywheel 11 to a spigot journal 66 relation well within a recessed provision 67 therefor in the driven shaft 17. This construction renders the inner clutch shaft 18 a main spindle or axle to the entire intermediary transmitting assembly between the driving and driven members a and b, including the remainder of the concentric plurality clutch shaft embodiment and the planetary gear units in tandem. Accordingly, and in view of the absence of radial loads as a result of planetary gear trains being employed exclusively, a single main transmission bearing would suffice in the plane of the journal 66 of the axle-serving-clutch shaft 18. The usual detachable end 69 is found secured to and closing the open end of the gear case 62.

That the planetary gear units and concentric shafts may receive lubricant from the main axis, from where it would be facilitated to distribute advantageously by centrifugal influence, the central clutch or intermediary shaft 18 is drilled preferably from the rear end as indicated by 70. A reservoir 71, designed to catch the oil thrown by the planetary gear unit c, is formed in the end member 69 and gives a gravity communication for the oil thus impounded through radial holes 72 and a grooved and drilled spacer 73 to the distributing duct 70.

A bulkhead or forward wall l to enclose the gearing in an oil tight compartment is provided preferably by a series of detachable plates 74, 75 and 76 together with the flanged portion 77 of the usual guide sleeve 78 the latter accommodating the carriage 79 of the clutch release bearing 80, but formed with a bell portion 81, all bolted together as indicated at 82 and as a unit bolted to the case 62 as indicated at 83.

The plate 76 is extended radially inward with oppositely longitudinally disposing cammed hub portions 84 and 85, respectively, forming stationary reaction members to the separate overrunning clutch type brake units e and f. Completing each of these reaction brake units e and f, are similar concentric annuluses 86, each having a flange portion 87 terminating at a reduced diameter in internal teeth indicated by 88 of the reaction brake unit e and by 89 of the reaction brake unit f, and roller brake members 90 engaging the stationary cammed hubs 84 and 85 and respective annulus 86 respectively of the brake clutch units e and f. Hence each of the reaction brake units e and f have individual engageable and disengageable brake members, respectively, 88 and 89.

That the planet carrier 53 of the planetary gear unit d, which latter is disposed between the planetary gear unit c and the reaction brake units e and f, may operate as a selective connectable and disconnectable train between the reaction gear element 50 of the planetary gear unit c and its individual reaction brake unit e, the planet carrier 53 is constructed with oppositely extending hub portions 91 and 92. Clutch jaws 93 being formed on the forward extension 91 of the planet carrier 53 for reaction engagement with the clutch teeth 88 of the reaction brake unit e and clutch teeth 94 are formed on the rearward extension 92 of the planet carrier 53 for reaction engagement with the clutch teeth 57 of the reaction gear element 50 of the planetary gear unit c so that the latter may gear drive singularly. The engagements of mate clutch teeth 88 and 93 and of mate clutch 57 and 94, in which state such is illustrated by Figure 1 of the drawings, constitutes the preselection by shifting of the planetary gear unit d into an intermediate position of a longitudinally shiftable range, establishing the transmission for automatic range operation and change speed control. In connection with this intermediate preselective positioning of the planetary gear unit d, it will be seen that the reaction internal gear element 54 of the planetary gear unit d also has forwardly and rearwardly extending hub portions 95 and 96, respectively, upon which are formed external clutch teeth 97 and 98. The clutch teeth 98 being in engagement with the clutch teeth 89 of the individual reaction brake unit f of the planetary gear unit d while the latter occupies its aforesaid intermediate position serving as the preselection for automatic transmission performance. Thus I have described the individual reaction transmitting train connections between each of the planetary gear units c and d and their respective reaction brake units e and f, as established in the way of selecting the transmission to operate automatically by shifting of the planetary gear unit d into an intermediate of two extreme longitudinally shiftable drive establishing positions.

At the extreme forward end of the forward extending portion 91 of the planet carrier 53 of the planetary unit d is the engaging element 99 of the positive type centrifugal automatic clutch unit g carried rotatable with the member 53. The mate engageable element of this clutch unit g is found to comprise a cylindrical form 100 carried rotatable with the clutch shaft 20, with which latter the conventional clutch unit h is related to give a tandem clutch function with the centrifugal clutch unit g, to accomplish a direct drive connection of the planet carrier 53 (individual driven element) of planetary gear unit d with the primary driving member a upon the centrifugal clutch unit g becoming engaged. Any form of centrifugal automatic clutch mechanism which will respond to a predetermined speed of rotation of one of the two driving and driven parts to this connectable coordinate constituting in this embodiment of the present invention, respectively, the driving part 100 and the driven part 91, would serve the respective purpose. It should be of a form which would depend upon the speed of the respective driving and driven members 100 and 91 becoming synchronized before allowing engagement of the respective clutch unit at this juncture, whereby, the planetary gear units c and d would continue to gear drive until the operator had allowed the primary driving member a and associate intermediary driving elements 18, 19 and 20 to momentarily decelerate, with resultant effected rotation of the reaction train represented by member 91 under momentum of the driven member b taking place through the medium of the consequently overrunning inter-operatively connected planetary gear units c and d, is preferred. Such a preferred form of centrifugal automatic clutch is known for its characteristics calling for a so-called reverse of torque and synchronization of respective engageable clutch parts consequently taking place, and a suitable construction of clutch unit having these preferred characteristics is found illustrated more in detail by Figure 3 of the accompanying drawings. Reference thereto finds the aforementioned engaging clutch element 99 to consist of a centrifugal weight taking the form of a centrifugally projectable engaging clutch member arranged for radial movement between guides 101 and 102 rotatable with the member 91. Latterly extending portions 104 of the member 99 serving as portions of the latter to which are anchored retractive springs 105 and 106, respectively, at their opposite ends to provisions 107 and 108 made therefor a part of the member 91. An opening 109 to receive the weight 99 is provided in the cylindrical form 100 whereby the latter takes on the component clutch relation as the engageable driving element to the clutch unit g, leaving the weight 99 to cooperate as the mate driven but engaging clutch element thereto. The nature of this clutch unit g is for the centrifugal weight clutch engaging element 99 to rest retracted at its innermost base under tension of the springs 105 and 106 as long as the carrier member 91 operates as a reaction train, also at rest, under a tendency to rotate backwards against its backwards rotation brake unit e. While the driving engageable element 100 to the engaging clutch element 99 rotates normally in connection with the driving member a by virtue of the normally engaged clutch unit h. The direction of this rotation being indicated by the arrow of Figure 3. Upon the driving member a being momentarily decelerated, or whenever the driven member b overruns the clutch shafts 18 and 19 sufficiently to cause the internal gear 50 of the planetary gear unit c to assume a driven response to the driven member b, and consequently in turn, the reaction member 91 to the unit c to rotate with the gear 50 sufficiently to energize the member 99 to tend to centrifugally project itself into the opening 109, the clutch unit g will be making an effort to engage, requiring only that the speed of the member 99 reach synchronization with the member 100 long enough for the member 99 to enter the opening 109. This accomplished, the power or acceleration of the driving member a may be resumed to find the planetary gear units c and d both locked to rotate as a unit as a consequence of the reaction member 91 being connected directly to rotate with the driving member a through the medium of the engaged clutch units g and h operating in tandem to close the direct driving circuit of the intermediary transmitting means. Thus, the transmission reaches its third or high automatic speed ratio. Incident to the transmission operating in the high speed (direct drive) state, the annuluses 86 of both reaction brake units e and f rotate with the direct drive coupled planetary gear units by virtue of roller brake members 90 relaxing on their respective cams of the respective brake unit hubs 84 and 85. The reaction clutch units e and f thereby remain mobilized to again operate as reaction elements to their respective associate planetary gear units at any time the clutch unit g is caused to disengage, such as the latter will do under the urge of the springs 105 and 106 whenever the engaged unit g reaches a predetermined decelerated speed of rotation at which the tension of these springs over-balances the centrifugal force of the weight element 99 sufficiently to retract same out of the opening 109. Thus I have described in detail the mechanism for obtaining the automatic range of operation of the present transmission giving the second, third and fourth speeds of its four forward speed capacity.

In connection with the shiftability of the planetary gear unit d and for the rendering of the same capable of operating singularly, when shifted out of its intermediate position (in which it is shown preselected establishing the automatic range operation of the transmission) and into a forward position to give a permanent and positive (two-way) first speed ratio forward gear drive, or when shifted into a rearward position to give a permanent and positive reverse gear drive, in either case, between the clutch shaft 20 and the driven member b, respectively, whereby a positive driving connection between the engine or primary driving and driven members a and b will be normally completed by the clutch unit h. A jaw clutch member 110 taking the form of a cylinder having internal clutch teeth 111 and 112, respectively, at its opposite ends is found carried longitudinally shiftable with, but free to rotate independently of, the member 91. The latter being a shiftable integral part of the planetary gear unit d, assures that this individual coupling clutch member 110 will have the same shiftable status as the gear unit d. Corresponding external clutch teeth 113 are formed on the rearward end of the clutch shaft 20, while similar clutch teeth 114 are formed on the contiguous portion of the clutch shaft 19. Engageable with the clutch jaws 56 (in connection with establishing the reverse drive) are the aforementioned clutch teeth 98 formed on the rearward hub portion of the internal gear 54 of the planetary gear unit d. For alternate engagement by the clutch teeth 93 (in connection with the shift of the gear unit d into the permanent positive first forward speed) and for alternate engagement by the clutch teeth 97 (in connection with the shift of the gear unit d into the permanent positive reverse speed) are clutch teeth 116 formed on the positively stationary member 76. The respective alternative engagements of these clutch teeth units involving states of positive stationary establishments, respectively, for the internal gear member 54 in connection with rendering same a positive reaction member for the gear unit d to render the permanent and positive (two-way) forward first speed gear drive when shifted forwardly, and for the planet carrier element 53 of the gear unit d in connection with rendering this planet carrier singularly a positive reaction member for the gear unit d to render the permanent and positive (two-way) reverse gear drive when shifted rearwardly.

The operation follows:

*Automatic range.*—With the driving member a (engine) rotating at an idling speed and the driven member b (vehicle) at rest, the clutch units i and k will be found disengaged, the planetary carrier 34 of the unit j stationary, the internal gear 32 of the latter (rotating with the driving member) driving the sun gear 31 of the same unit in a reverse direction through the medium of the planet gears 33, and the clutch unit h normally engaged. Hence the transmitting gearing, and more particularly the gear 51, being at rest, allows for the shifting of the planetary gear unit d into or out of any one of its drive preselective functional positions without releasing the clutch unit h. After the planetary gear unit d has been shifted into any of the preselecting drive establishing positions, release of the clutch unit h renders the primary engaging or the only driving member speed responsive automatic clutch unit i inoperative, so that preselected in any drive the engine may be accelerated in the customary manner, while holding the clutch unit h released also in the customary manner, without incurring motivation to the vehicle.

*First automatic speed.*—Having established the planetary gear unit d in the position in which it is illustrated, the engine is accelerated. The increased engine speed (above idling) induces the centrifugal weights 27 to gradually superenergize the normally engaged clutch unit h until a pressure exerted in a forwardly direction resides therein sufficient to cause the bottom acting plate 16 to move forwardly, overcoming the tension of the springs 28, and in turn forcing the member 13 to be gradually moved forwardly until its presser plate portion 14 engages and packs the driven disk 30 against the flywheel 11. Whereupon the sun gear 31 is brought up to the rotation speed of the driving member a, and under the joint driving of the internal gear 32 and the sun gear 31, the clutch shaft 18 is also driven from and at the speed of the driving member a. In turn the sun gear 47 of the planetary gear unit c is driven at the speed of the driving member a. Resulting in the reaction gear 50 applying backwards through the transmitting medium of the engaged clutch teeth 57 and 94, the members 92 and 91 to the planet carrier 53 of the planetary gear unit d and the engaged clutch teeth 93 and 88 to the one-way brake unit e. In turn causing the planet carrier 49 and integral driven member b to be driven at the first speed (exemplary 2:55 ratio) from, and relative to, the speed of the driving member a.

*Second automatic speed.*—Having accelerated the vehicle under drive of the first automatic speed to substantially 15 M. P. Hr., the driven clutch plate 35 being carried rotatable with the operating clutch shaft 18 results in the links 40 and 41 attaining a sufficient centrifugal force to overcome the tension of the spring 45 and, by the pin 42 moving outwardly, accomplishing the collapse of the normal dead center toggle. This results in the clutch plates 35 and 36 being released for actuation by the master centrifugal weights 39. Whereupon, the latter immediately energize this driven centrifugal automatic clutch unit k to engage to a full capacity state, tightening, characteristically, through its novel relation, both the engagements of the clutch units i and h and the driven disk 36ᵃ, consequently becomes clutched to rotate with the driving member $a$, causes the clutch shaft 19 and its integral sun gear 51 to come into play (rotatable now with the second clutch shaft 18). Hence planetary gear unit $d$ goes into action, gear driving in series with the planetary gear unit $c$. This takes place by virtue of the internal gear 54 applying its driven tendency to rotate backwards, under the subsequent drive of the planet gears 52 and the sun gear 51, through the medium of engaged clutch teeth 97 and 89 to its individual one-way brake unit $f$. The resultant transition of the train comprising members 92, 53 and 91, is from a reaction transmitting element to the internal gear 50 of the planetary gear unit $c$, to a driven member of the planetary gear unit $d$ operating now to drive the internal gear 50 of the planetary gear unit $c$, supplementary to the drive of the sun gear 47 thereto. Second automatic speed drive of the driven member $b$ results of this series planetary gear unit operation wherein both units $c$ and $d$ contribute to a higher gear driving speed. It will be noted at this point, that the centrifugal engaging element of the clutch unit $g$ rotates with the transmitting train of members 92, 53 and 91, but due to the speed reducing effect of the planetary gear unit $d$, at appreciably lower speed (in the same direction) than the driving engageable clutch element 100, which latter rotates (directly connected by the clutch unit $h$) with the driving member $a$. By virtue of this speed differential, the automatic clutch unit $g$ may not alter the automatic second speed ratio of drive, now prevailing, until the speed of the members 99 and 100 is allowed to reach synchronization. Hence the automatic second speed may be retained, regardless of vehicle speed, as long as desired by simply maintaining the flow of torque toward the driven member $b$.

*Third automatic speed (direct drive).*—The driving member $a$ (engine) is momentarily decelerated. This results in the clutch shafts 18 and 19 slowing down. Whereupon, the driven member $b$ becomes load-propelled, consequently maintaining its speed, and, carrying the planet carrier 49 with it promotes the acceleration first of the internal gear 50 and in turn its connected train consisting of members 92, 53, 91 and 99. This acceleration of the centrifugal engaging clutch element 99 of the unit $g$, while its mate engageable clutch element 100 is decelerating with the driving member $a$, almost instantly brings about the aforementioned synchronization of speed of the parts 99 and 100, whereupon the element 99 engages the element 100. Incident to this centrifugal automatic engagement of clutch unit $g$ is the automatic establishment of the transmission in high, a positive direct drive coupling of the intermediary transmitting trains between the driving and driven members $a$ and $b$. Being the third and top speed of the three speed automatic range. Since the clutch unit $k$ is restrained, to an abnormally high speed of rotation attainment before it is allowed, by the collapse of the links 40 and 41 from their normal dead center toggle state, to engage, desirably the arrangement assures that clutch unit $k$ may be adjusted with predetermined retractive spring and centrifugal weight coefficients which will cause this clutch unit to remain engaged, incident to deceleration of the vehicle, until the latter reaches a speed considerably lower than the vehicle speed at which the clutch unit $k$ engaged. This contributes to the transmission, once reaching automatic establishment of its high speed ratio, remaining in such to a comparatively low vehicle speed, in the way of example approximately 10 M. P. Hr.

Similarly, the dependency of the clutch unit $g$ upon parts synchronization for its engagements, affords that it can be adjusted with predetermined spring and centrifugal weight coefficients which will render it capable of engaging at a comparatively low vehicle speed attainment, whereby, it too will normally maintain engaged down to, in the way of example, approximately 10 M. P. Hr.

Hence, the automatic range of the present transmission gives the driver control over its automatic change from the intermediate automatic speed to the high automatic speed, and enables the high speed ratio to prevail, as is more often desired, down to a comparatively low vehicle speed.

*Optional control to cause automatic reversion from automatic high speed to intermediate speed under full power ahead, if desired.*—At any reasonable vehicle speed at which the higher torque of the intermediate speed ratio would be an advantageous alternative to the high speed ratio, the same may be accomplished by maintaining the driving member $a$ (engine) under acceleration while momentarily releasing the clutch unit $h$. This will result in the engaged centrifugal automatic clutch unit $g$, responsible for the high speed ratio establishment, being loosened from the driving member $a$, while the intermediary driving clutch shafts 18 and 19 are retained rotative with the driving member $a$ through the medium of the centrifugal automatic clutch unit $k$. Consequently, during this moment in which the clutch unit $g$ is detached from the driving member $a$, the planetary gear units, under the maintained acceleration of their sun gears 51 and 47, will revert to gear driving of the driven member $b$. Whereupon, the reaction gear 54 of the planetary gear unit $d$ will again come to rest against its reaction clutch brake unit $f$, reducing the speed of the train comprising members 92, 53 and 91 and, including the engaged clutch unit $g$ so greatly, due to the low ratio of the gear unit $d$, that the centrifugal force of the weight 99 of the clutch unit $g$ will become so low as to allow the springs thereto to retract the member 99 out of engagement with the driving member 100 thereto. Hence, the direct drive coupling is opened by this momentary release of the clutch unit $h$ while the flow of power is maintained in effect to drive the driven member $b$. Incident to the clutch unit $h$ being released, the two planetary gear units $d$ and $c$ instantly non-statically assume the load, provided acceleration of the driving trains thereto is high enough to compensate for their speed reducing ratios. Obviously, the transmission may again be automatically established in high by momentarily decelerating the driving train to the planetary units $c$ and $d$. Thus I have described in detail the operation of the three speed automatic range of the illustrated transmission embodiment of the present invention.

*Optional positive low gear, for parking in gear, driving permanently in a low ratio or for engine compression brake to descend grades.*—This is the first of the four speed capacity of the transmission and constitutes a gear one ratio lower than the first or initial load starting speed of the three speed automatic range. It is establishable by slowing the vehicle down, as customary to shift conventional transmissions to a low gear ratio, shifting the clutch unit *d* to an extreme forward position. This takes the clutch teeth 57 and 94 out of engagement, thus disconnecting the reaction gear 50 of the planetary gear unit *c* from its individual reaction brake unit *e*, whereby gear unit *c* is rendered inoperative to transmit to the driven member *b*. It further takes the clutch teeth 97 out of engagement with teeth 89 and into engagement with the positive teeth 116, whereby the planetary gear unit *d* is rendered a positive two-way transmitting gear train. It further takes the clutch teeth 94 into engagement with the teeth 56, thereby the planet carrier element 53 of the planetary gear unit *d* becomes a driving member directly to the driven member *b*. It also takes the clutch teeth 93 out of engagement with the clutch teeth 88, and it brings the clutch teeth 112 into engagement with both the clutch teeth 113 and 114, whereby the sun gear 51 becomes permanently and positively connected rotatable with the clutch shaft 20. The clutch unit *h* is thusly placed in control over and to complete or disestablish the driving connections of this positive low gear ratio train through the medium of the planetary gear unit *d* singularly between the driving and driven members *a* and *b*. It will be observed that because of the rendering of the planetary gear unit *c* in neutral, engagement or disengagement of the automatic clutch units *i* and *k* will have no effect, other than to super-energize the allowed engagement of the clutch unit *h*.

*Dead engine starting from momentum of the vehicle.*—Provision for this is necessary in any form of automatic transmission for vehicles equipped with internal combustion engines, requiring that the vehicle be pushed by another vehicle, as on cold mornings, to get the engine started. The selective gear capacity of the planetary gear unit *d* together with the clutch unit *h* meets this requirement.

*Reverse.*—This direction of rotation is established by shifting the planetary gear unit *d* to an extreme rearwardly position. This takes the clutch teeth 94 out of engagement with teeth 57, thereby rendering the gear unit *c* inoperative to transmit power; brings the clutch teeth 98 into engagement with clutch teeth 56, thereby connecting the internal gear 54 of the gear unit *d* to directly drive the driven member *b* in reverse; takes the clutch teeth 97 out of engagement with the teeth 89, thereby freeing the internal gear 54 to rotate backwards; takes the clutch teeth 93 out of engagement with the teeth 88 and brings the teeth 93 into engagement with the positive clutch teeth 116, thereby locking the planet carrier 53 of the gear unit *d* stationary to the gear case 62 whereby the gear unit *d* is rendered a reversing gear, the planet gears 52 of same operating to drive the internal gear 54 and the latter's now connected driven member *b* backwards under forward drive of the sun gear 51; and brings the clutch teeth 111 into engagement with both the teeth 113 and the teeth 114, thereby positively coupling the sun gear 51 to rotate with the clutch shaft 20. Hence, the selected establishment of reverse drive by the planetary gear unit *d* is also placed solely under the control of the clutch unit *h*, similar to the selected establishment of the same planetary gear unit to give the positive forward gear drive.

Compared to the usual variable speed transmission provision for one clutch unit to transmit all of the power in the high speed ratio under the conditions of which, friction type clutch adaptations if kept within practical size, weight and inertia limits, have always presented the problem of slippage. The embodiment in the present invention of two intermediary transmitting trains, each delivering its power transmission ratio to the common driven member through the medium of a planetary gear unit, and each of these joint transmitting intermediary transmitting trains embodying a separate friction clutch operating to complete the driving connections of the respective transmitting train between the primary driving and final driven member, very practicably reduces the respective clutch duty by one-half. It is seen that the slippage problem is thus obviated.

A further important phenomenon of dividing the power to be transmitted between the respective multi-transmitting trains to give a given speed ratio of drive resulting from novel provisions and coordinations in the present embodiment is found to reside in the provision and relationship, particularly of the plurality of planetary gear units adapted to operate in series to contribute to certain of the multi-speed ratios of transmission, and the plurality of separate centrifugal-actuating-means-equipped automatic-friction-type clutches adapted to collectively operate but to respectively complete the driving connections of the respective of the plurality of planetary gear units whereby they will gear drive in series to contribute to the certain of the multi-speed ratios of transmission. Wherein, by way of example, assuming the ratio of the sun gear 47 to the internal gear 50 of the unit *c* to be 1:55 (respectively giving a forward speed reduced drive of 2:55 ratio to its driven member-associated planet carrier 49) and assuming the ratio of the sun gear 51 to the internal gear 54 of the unit *d* to be 2:40 (respectively giving a forward speed reduced drive of 3:40 to its planet carrier 53, and in turn to the internal gear 50 of the unit *c*), resulting in a reduction drive of substantially 1:75 by the combined efforts of the two units *d* and *c* between the two sun gears 51 and 47 (rotating at the same speed) and the driven member *b*. Giving the relative pitch line velocities, and proportionately the ratio of the power transmitted, of substantially 33% and 67%, respectively, by the joint driving internal gear 50 and sun gear 47 of the final transmitting planetary gear unit *c* to the common driven member *b*. Which, traced forwardly, finds the centrifugal automatic clutch unit *k* transmitting the 33% and the drive coupling, combining the planetary gear unit *j* and the centrifugal automatic clutch unit *i*, transmitting the 67%. Due to the planetary gear unit *j* transmitting substantially 75% of the power to propel the 67% ratio of the load thus placed upon the shaft 18, the clutch unit *i* transmitting the other 25%, the latter clutch unit in the sum-up is required to transmit substantially only 17% of the power transmitted through the medium of the two planetary gear units *d* and *c* gear driving in series. This works out with phenomenal advantage, in that the centrifugal actuating coefficient of the weights 27, forming a semi-automatic actuating or clutch engaging effect primarily to the optionally disengageable clutch unit *h* and secondarily for the centrifugal automatic engagement of the clutch unit *i*, may be comparatively low, such that optional control clutch unit *h* may be disengaged (released) with comparative ease. Also, compatible with the centrifugal automatic clutch unit *k* being required to transmit the 33% of the power thus distributed (which ratio of the whole assigned to the unit $k$ while high as compared to the requirement upon the clutch unit $i$, still constitutes a minimum requirement upon the clutch unit $k$,) are the provisions for the latter to engage at a high rate from a positively free state to a positively engaged state.

Thus it will be seen that I have provided a variable speed transmission particularly well suited for use in motor vehicles, incorporating a rugged, comparatively simple and inexpensive all mechanical automatic change speed transmission coordination comprised of the three higher speed ratios of four forward speed provisions and preselectable with ease for operation as the automatic range, and including the important optional control means whereby the automatic range, once established in its highest speed ratio, may be caused, phenomenally, to undergo a transition back to a relatively lower speed ratio without interruption of the power maintaining its drive upon the load; and incorporating a simple standard selective permanent and positive first (lowest ratio) forward speed and permanent and positive reverse speed in conjunction with a cooperating customary spring-means engaged clutch unit for normal engagement in lieu of such by the centrifugal automatic clutch provisions and for optional release in connection with shifting between the first and reverse positive gears. The latter meeting all the customary requirements, such as parking in gear, starting the engine in gear, utilizing the engine compression effectively in gear as a brake descending steep grades, and declutching (while preselected in either automatic range gear or selective positive forward and reverse gears) to permit acceleration (racing) the engine without causing propulsion of the vehicle.

It will be understood that various changes, including the size, shape and arrangement of the parts and range of adaptations may be made without departing from the spirit of my invention, and it is not the intention to limit its scope other than by the terms of the appended claims.

I claim:

1. An automatic transmission mechanism comprising, in combination, a driving member; a driven member; a first transmitting means in operating connection with said driven member, including a first planetary gear unit having an individual driving mechanism including an intermediary transmitting member for coupling to rotate with said driving member, and coupling means automatically operable in response to variations in the speed of said driving member and operating to couple said intermediary member to said driving member forming a first automatically establishable speed ratio of drive means between said driving and driven members; second transmitting means in operating connection with said driven member, including a second planetary gear unit in series with said first planetary gear unit to employ at least a portion of the latter as a transmitting medium to attain said operating connection with said driven member at a faster speed than resultant of transmission through one of said planetary gear units singularly, said second planetary gear unit having an individual driving mechanism including an individual intermediary transmitting member for coupling to rotate with said driving member, and coupling means automatically operable in response to variations in the speed of one of said intermediary and driving members and operative to couple said individual intermediary member to rotate with said driving member forming a second automatically establishable speed ratio of drive means between said driving and driven members; and a third transmitting means between said driving and driven members, including an individual driving mechanism normally driven from said driving member, in association with said driven member but adapted to employ certain portions at least of each of said first and said second planetary gear units as transmitting medium to attain an operating connection with said driven member at a faster speed than resultant of transmission through said second automatically establishable speed ratio of drive to said driven member, said third transmitting means including a member of one of said planetary gear units adapted to manifest retrograde rotative tendencies when forward rotative efforts are applied to said planetary gear unit for transmission toward said driven member and adapted to manifest forward rotative tendencies when rotative efforts in the same direction are applied to said planetary gear unit but from the direction of said driven member, a one-way stop means for preventing said retrograde rotation of said member, an individual driven portion of said driving mechanism of said third transmitting means normally rotatable with said retrograde tending member, a clutch device between said driven portion and the portion of said driving mechanism of said third transmitting means driven by said driving member, said clutch device forming means automatically operable in response to variations in the speed of one of said driving and driven portions of said driving mechanism for coupling said portions together, all forming a third automatically establishable speed ratio of drive means between said driving and driven members.

2. The automatic transmission mechanism described by claim 1, together with means including frictionally engaging elements provided with means normally but yieldingly operating to engage same and provided with means for optionally disengaging said elements, forming a normally operating drive coupling means in series in said third automatically establishable speed ratio of drive means whereby said speed responsive automatic clutch device thereof operates to complete the driving connections of said means between said driving and driven members but such that said completed driving connections may be abnormally disestablished at the will of the operator by disengaging said frictionally engaging elements, and forming means operative incidental to said disengagement of said frictionally engaging elements permitting said retrograde tending member to revert to normal relations with said one-way stop means under conditions of said forward rotative efforts applying to said planetary gear unit while said frictionally-engaging elements are temporarily disengaged for the consequential disengagement of said speed responsive automatic clutch device, and all incidentally whereby said optionally disengageable frictionally engaging elements form means for the controlled obtaining of abnormal disengagement of said speed responsive automatic clutch device, such that the transmission may be optionally caused to revert from said third to said second automatically established speed ratio of drive between said driving and driven members while the power is maintained flowing through the transmission to drive said driven member.

3. The transmission mechanism described by claim 1, together with means for disestablishing one of said planetary gear units from said series with the other planetary gear unit and for selectively establishing said one planetary gear unit gear drive operative singularly to either give a fixed forward speed or a fixed reverse speed, in either of said fixed speed establishments whereby said automatically establishable speeds are rendered neutral and in either of said fixed speeds whereby said one planetary gear unit is established in positive operating connections with said driven member and with said driving member the latter through the medium of said individual driving mechanism of said third transmitting means normally driven from said driving member; and a normally engaged but optionally disengageable friction clutch in series in said individual driving mechanism, forming means disengageable to facilitate said selective establishing of said one planetary gear unit either to give said fixed forward or said fixed reverse speeds, and when engaged forming means completing the driving connections of said fixed forward or said fixed reverse speed gear drive operations of said one planetary gear unit between said driving and driven members.

4. In combination with driving and driven members and variable transmission means between said members including intermediary transmitting members; of means including a first centrifugal automatic clutch mechanism carried by one of said members for completing the driving connections of said variable transmission means at one rate between said driving and driven members; means including a second centrifugal automatic clutch mechanism carried by one of said members for completing the driving connections of said variable speed transmission means at a higher rate between said driving and driven members; and means including a plurality of planetary gear trains operatively interposed in said variable transmission means such that a first certain portion of said planetary gear trains gear drive operate in effecting transmission contributory to said driving connections at said one rate as completed by said first centrifugal clutch and such that a second certain other portion of said planetary gear trains gear drive operate in effecting transmission of power but in series accumulatively gear driving with said first portion so as both contribute to culminated driving connections to give said higher rate as completed by said second centrifugal clutch, forming means whereby the power transmitted through said higher rate driving connections between said driving and driven members is divided between simultaneously gear drive power transmitting multi-trains of planetary gears and is divided between a plurality of simultaneously operating centrifugal automatic clutches.

5. A change speed power transmitting mechanism including driving and driven members and having a variable speed transmission means between said driving and driven members including a first speed transmitting train and a second speed transmitting train and a third speed transmitting train and a system of planetary gear mechanism operatively interposed operatively connecting all said trains whereby, completed driving connections of said first speed train between said driving and driven members will employ said planetary gear mechanism contributory to a low speed ratio of drive transmission from said driving member to said driven member, whereby, completed and joint operating driving connections of both said first and said second trains between said driving and driven members will operate to cause a first change speed transition in the operation of said planetary gear mechanism and employ an increased number of gears of the latter gear drive transmitting power contributory to an intermediate speed ratio of drive between said driving and driven members, and whereby, completed and joint operating driving connections of said first, said second and said third trains between said driving and driven members will operate to cause a second change speed transition in the operation of said planetary gear mechanism and employ the latter contributory to a high speed ratio of drive between said driving and driven members; individual drive coupling means provided with each said first, said second and said third trains, respectively, for completing their said driving connections; control means over the coupling means of said first train whereby same will normally be first coupling connected drive operative between said driving and driven members; control means over the coupling means of said second train whereby same will normally be secondly coupling connected drive operative between said driving and driven members and as such depending upon the completed driving connections of said first train for a closed intermediate speed transmission circuit between said driving and driven members; and control means over the coupling means of said third train whereby same will normally be lastly coupling connected drive operative between said driving and driven members and as such depending upon the completed driving connections of both said first and said second trains for a closed high speed transmission circuit between said driving and driven members.

6. The power transmitting mechanism described in claim 5, together with a member associated with said planetary gear mechanism adapted to change its normal speed upon said driving member being decelerated from under the drive at least of said second transmitting train to said driven member and a coaxial member in contiguity with said member and associated with said third transmitting train, and respectively adapted to change its speed incident to said deceleration of said driving member, said associated members adapted to reach synchronism under their respective said changing speeds incident to said deceleration of said driving member; and a clutch device automatically operable in response to variations in the speed of one of said contiguous members and adapted to couple said members together when said one member attains sufficient speed and when said members reach said synchronism forming at least a unit of said individual coupling means provided with said third transmitting train.

7. A change speed power transmitting mechanism including driving and driven members, having, in sub-combination, variable speed transmission means between said driving and driven members including dual transmitting trains leading from said driving member to said driven member and having planetary gear mechanism interposed operatively connecting said dual transmitting trains, such that completed driving connections of a first one of said dual trains between said driving and driven members will include only a portion of said planetary gear mechanism and through the singular gear function of which portion a low speed ratio will be rendered, and such that complete driving connections of the second of said dual transmitting trains between said driving and driven members will include said portion of said planetary gear mechanism aforesaid for singularly rendering said low ratio and an additional portion of said planetary gear mechanism for accumulative gear function thereover thereby to establish a closed circuit of speed altering gear driving connections whereby said driven member would be driven at second higher speed ratio from said driving member; firstly operably adapted individual drive coupling means for coupling the driving connections of said first of said dual trains between said driving and driven members, substantially as described; and secondly operably adapted individual drive coupling means for coupling the driving connections of said second of said dual trains between said driving and driven members, substantially as described.

8. The transmission mechanism described by claim 7, together with a member associated with said driven member through the medium of said planetary gear mechanism, a contiguous member, a friction clutch element associated with said driving member and two-way drive operatively connected with said contiguous member, means acting to normally but yieldingly engage said friction clutch element, and a centrifugal automatic clutch mechanism responsive to the speed of one of said contiguous members and adapted on sufficient speed to couple said members together, forming means for establishing a faster speed ratio of drive connection between said driving and driven member such that at least one of said first and said additional portions of said planetary gear mechanism undergoes a transition changing its speed ratio of transmission, and said friction clutch element provided with means whereby the operator may cause disengagement of same at will forming means thereby for disestablishing said faster speed ratio of drive between said driving and driven members over the engaged state of said centrifugal clutch.

9. In a motor vehicle transmission, in combination with a driving member adapted to take the rotative efforts of the vehicle engine, a driven member adapted to be operatively coupled to the vehicle wheels, an intermediate shaft solely for direct drive coupling to take said rotative efforts from said driving member at the same speed and a variable speed transmission means connecting said intermediate shaft to drive said driven member forming the sole speed altering and torque multiplying transmitting mechanism between said driving and driven members; of a power coupling solely for direct drive transmission between said driving and intermediate members comprising, an epicyclic gear train permanently mobilized in operating connection between said driving and intermediate members and whose gear elements are adapted for gear running solely as an idling performance between said driving and intermediate members, and a clutch provided with means for engaging and disengaging same forming means solely for closing a direct drive transmission circuit formed jointly of said epicyclic gear train and said clutch between said driving and driven members, such that the elements of said epicyclic gear train will operate to transmit the power between said driving member and said intermediate member solely when connected with tendencies towards or when rotating as a unit and whereby said elements will transmit a high proportion of the torque and the clutch the remaining proportion of the torque between said driving member and said intermediate member.

10. In a power transmitting mechanism, in sub-combination, a driving member; a driven member for coupling to a load and carrying gears rotatable thereby; an internal gear meshing with said carried gears; a sun gear meshing with said carried gears; means operable to restrain retrograde rotative tendencies of said internal gear under influences of said carried gears in turn under forward drive rotative efforts of said sun gear; an internal gear rotatable with said driving member; a friction clutch element associated with said driving member; a sun gear rotatable with said clutch element; a rotatably mounted intermediary transmitting member carrying gears rotatable thereby and meshing with both said internal gear that is rotatable with said driving member and with said sun gear that is rotatable with said clutch element; and intermediary transmitting means operatively connecting said rotatably mounted gear-carrying member to drive said sun gear that is meshed with said gears that are carried by the driven member for coupling to a load.

11. In a power transmitting mechanism, in sub-combination, a driving member; a plurality of concentric driven members in axial alignment with said driving member; an internal gear rotatable with said driving member; a sun gear; a planet carrier rotatable with one of said driven members and carrying planet gears rotatable thereby and meshing with both said internal and sun gears; a first friction clutch element rotatable with said sun gear and associated with said driving member; a second friction clutch element rotatable with another of said driven members and associated with said driving member; resilient means normally acting to engage said second clutch element; means including centrifugal weights carried by said driving member and adapted upon sufficient speed of the latter to super-energize said engagement of said second clutch element; and means whereby solely the super-energized engagement of said second clutch element operates to in turn energize the engagement of said first clutch element.

12. In a power transmission mechanism including axially aligned driving and driven members; a speed responsive automatically operable direct drive coupling mechanism for connecting said driving and driven members to rotate together comprising, in combination, an internal gear non-rotatably fixed to one of said members, planet gears mounted by the other of said members and meshing with said internal gear, a sun gear meshing with said planet gears, a friction clutch element associated with said one member to which said internal gear is non-rotatably fixed, said clutch element positively connected to rotate with said sun gear, resilient retractive means normally effective to urge said clutch element out of engagement, and centrifugal weights carried by said one member and adapted to engage said clutch element upon said one member attaining a predetermined speed.

13. A pre-selective automatically variable or permanent positive gear drive transmission mechanism, comprising in combination, driving and driven members, an automatically variable system of multi-speed transmitting means between said driving and driven members having a plurality of planetary gear units selectively for operation in series but therein so as one or more than one of said planetary gear units may gear drive operate at one time, respectively, to contribute to different speed ratios of gear drive transmission between said driving and driven members, the individual planetary gear units comprising said plurality selected operative in said series each having individual transmitting trains to be operatively completed between said driving and driven members whereby the respective planetary gear unit may gear drive operate singularly, or cumulatively with other planetary gear units, respectively, contributory to said different speed ratios of drive between said driving and driven members, and individual automatically operable coupling means for operatively completing each of said individual planetary gear unit transmitting trains between said driving and driven members such that, firstly, certain of said planetary gear units gear drive operate while another planetary gear unit idles in the establishment of certain speed ratio of drive from said driving member to said driven member, and thereafter, such that said other planetary gear unit gear drive operates cumulatively with said certain planetary gear unit in the establishment of a relatively higher speed ratio of drive from said driving member to said driven member; means for selectively rendering said automatically operable system of transmitting means permanently neutral between said driving and driven members; and alternative means including a planetary gear unit selectively establishable either operative to give a forward two-way gear drive or operative to give a reverse two-way gear drive between said driving and driven members; and a normally engaged friction clutch under control of the operator for optional disengagement forming means for facilitating said selective forward or reverse operating establishment of said one planetary gear unit while disengaged and for completing the driving connections of the forward or the reverse gear drive of said one planetary gear unit between said driving and driven member when engaged.

14. A four forward speed and reverse power transmission comprising, in combination, driving and driven members, intermediary transmitting means including a plurality of planetary gear units and automatically operable drive coupling devices all pre-selectable by the establishment of said plurality of planetary gear units in series drive operative coordination to give second, third and fourth forward speed automatic range of automatic drive establishment and automatic change speed transitions between said driving and driven members; and means for alternatively selecting said transmission in either a fixed first forward speed or a fixed reverse speed between said driving and driven members, either whereby the automatic three speed range is established neutral, said fixed speed selecting means including means shiftable into and out of one position in which all of said planetary gear units are established in series drive operative coordination, shiftable into and out of a second position in which one of said planetary gear units is established two-way gear drive operative to give a first speed ratio of forward drive and shiftable into and out of a third position in which said one planetary gear unit is established two-way gear drive operative to give a reverse drive, and a positive transmitting train including a normally engaged but optionally disengageable friction clutch mechanism in series therein and forming means wherein said one planetary gear unit established in either said first forward or said reverse drive operates to complete the driving connections of said positive transmitting train between said driving and driven members when said friction clutch is engaged but such that said completed driving connections may be opened at any time by disengaging said clutch.

15. A variable speed power transmitting mechanism with driving and driven members, having in combination, a plurality of clutch shafts each for individual connection to be driven by said driving member, a plurality of planetary gear units comprising a separate and complete planetary gear unit driven for gear drive transmitting function by each of at least two of said clutch shafts, said plurality of planetary gear units adapted to be established in series gear drive operative coordination to complete individual driving connections respectively between each of said clutch shafts and said driven member, individual drive coupling means for operatively connecting each of said clutch shafts that have a planetary gear unit driven thereby for gear drive transmitting function with said driving member; means shiftable into and out of one position in which said plurality of planetary gear units are established in said series drive operative coordination, shiftable into and out of a second position in which said plurality of planetary gear units are disestablished from said series drive operative coordination and shiftable into and out of a third position in which one of said planetary gear units is established singularly gear drive operative; individual transmitting means completing the driving connections of said one planetary gear unit with said driven member when said one gear unit is established singularly gear drive operative and including a driving mechanism connected to drive said one planetary gear unit when same is established for said singular operation; and a normally engaged but optionally disengageable friction clutch mechanism between and normally connecting said driving mechanism of said one planetary gear unit to said driving member, forming means normally operative to complete driving connections of said singularly operative planetary gear unit between said driving and driven members and operable at the will of the operator to open said connections.

16. A pre-selectively automatic change speed or fixed gear transmission with driving and driven members and variable speed transmission means therebetween including, a plurality of planetary gear units and a plurality of variably automatically operable drive coupling devices cooperating with said variable speed transmission means and adapted automatically operable, when said plurality of planetary gear units are all established gear drive operative in series, to initially and successively establish different speed ratios of drive between said driving and driven members; one of said planetary gear units adapted to be disestablished from said series forming means whereby said transmission is rendered neutral; and means including an individual friction clutch element associated with one of said driving and driven members, provided with resilient means normally operating to engage same and means whereby the operator may optionally disengage same forming an individual clutch mechanism to said one planetary gear unit, and selective means operable in conjunction with said individual friction clutch for establishing or disestablishing said one planetary gear unit, respectively, in or out of said series, for establishing or disestablishing said one planetary gear unit two-way forward gear drive transmission operative between said driving and driven members, or for establishing or disestablishing said one planetary gear unit two-way reverse gear drive transmission operative between said driving and driven members.

17. In a transmission mechanism, in sub-combination, one power transmitting member; a plurality of concentric power transmitting members coaxial with said one member; means including a first friction clutch between and for individually direct coupling a first of said concentric members to said one member; means including a second friction clutch between and for individually direct coupling a second of said concentric members to said one member, said first clutch comprising a clutch automatically actuatable in clutch-engaging thrust motivations in response to variations in the speed of one of said members, said first clutch having resilient means tending to cause clutch engagement and means for releasably maintaining it disengaged against the action of the resilient means alone, or against the actions of both said resilient means and said speed responsive means whereby said first clutch may be engaged independently of the speed of said one member and whereby said first clutch may be disengaged over the influences of both said resilient means and said speed responsive means, and said second clutch comprising a clutch having resilient means tending to cause its disengagement and being in clutch engagement actuation association with said first clutch as to be responsive to said clutch-engaging thrust-motivations of said first clutch solely as effected by said speed responsive means thereto, to engage.

18. In a transmission mechanism, in sub-combination, a driving member; a pair of friction clutch elements associated with said driving member; a driven member adapted to be operatively coupled to a load; a first speed driving mechanism connected to be driven by one of said clutch elements and to drive said driven member, a first epicyclic gear train in series in said first speed driving mechanism, said first gear train having planet gears carried rotatable by said driven member, an orbital internal gear and a sun gear the latter driven by the train of said first speed driving mechanism that is connected with said one clutch element; a second speed driving mechanism connected to be driven by the other of said pair of said clutch elements, a second epicyclic gear train in series in said second driving mechanism, said second gear train having individual planet gears and an individual driven member carrying said individual planet gears rotatable thereby and in connection to drive said orbital internal gear of said first gear train, said second gear train having an individual internal gear orbital member and an individual sun gear the latter driven by the train of said second speed driving mechanism that is connected with said other clutch element; firstly operable means for engaging said one clutch element whereby said first epicyclic gear train may gear drive operate singularly to drive its individual planet gear carrying driven member; secondly operable means for engaging said other clutch element whereby said second epicyclic gear train may gear drive operate individually to first drive its individual planet gear carrying driven member and in turn operate in series with and through the medium of said first epicyclic gear train to drive said driven member that is adapted to be coupled to said load; and means for restraining retrograde rotative tendencies of either the internal gear of said first or the internal gear of said second epicyclic gear train.

19. The transmission mechanism described by claim 18, wherein said means firstly operable to engage the clutch element of said first speed driving mechanism is automatically operable in response to variations in the speed of said driving member and adapted to engage said one clutch element when said driving member attains a first predetermined speed; and wherein said means secondly operable to engage said other clutch element being that of said second speed driving mechanism is automatically operable in response to variations in the speed of the unit embodiment as clutched by the speed-responsive-means engagement of said one clutch element and adapted to engage said second speed clutch element when said first clutched embodiment attains a predetermined speed relatively higher than said first predetermined speed of said driving member alone.

20. The transmission mechanism described by claim 18, together with an epicyclic gear train in connection with said driving member, in connection with one of said first and second speed driving mechanisms and in connection with the respective clutch element of the same speed driving mechanism, forming means contributory with said clutch element to cause a direct drive coupling between said driving member and the respective speed driving mechanism whereby the gear elements of said epicyclic gear train will merely function statically to transmit power between said driving member and the respective speed driving mechanism and require only slight transmission on the part of the friction clutch element to the respective coupling.

21. In a transmission mechanism, in sub-combination, a driving member; a coaxial driven member; a friction clutch element associated with one of said driving and driven members and non-rotatably fixed to the other of said driving and driven members; and means automatically operable to engage said clutch element in response to variations in the speed of said one member but such that said engagement will take place only when said one member attains a predetermined comparatively high speed and such that the disengagement will not take place until said one member has decelerated to a predetermined relatively and appreciably lower speed, said automatically operable means including a master system of speed responsive elements adapted to energize engagement of said clutch element, master resilient means constantly operating to urge disengagement of said clutch element but such that said master speed responsive means would normally tend to effect said engagement in response to a relatively low speed attainment by said one member, a sub-system of means also responsive to the speed of said one member but forming means operable to prevent said engagement under said low speed responsive tendencies of said master system of speed responsive means until said one member has attained said comparatively high speed at which said master system of speed responsive means would have sufficient force to cause said engagement with a small period of slip, said sub-system of speed responsive means adapted to then operate to permit said clutch engagement; and sub-resilient means operative to restrain said sub-speed responsive means from operating to permit said engagement until said one member has attained said comparatively high speed.

22. In a transmission mechanism, a gear having a clutch toothed integral portion, a normally independently revolvable transmitting member having aligned corresponding clutch teeth, an axially shiftable concentric member revolvable independently of said gear and said transmitting member, a clutch member rotatably carried by said shiftable member but to shift as a unit with the latter, said clutch member having corresponding clutch teeth for simultaneous engagement with the clutch teeth of both said gear and said transmitting member forming means for positively coupling said members together, while the clutch carrying shiftable member is left revolvable independently of said gear and said transmitting member, and means to shift said shiftable member either into or out of one position in which said clutch teeth engage the clutch teeth of both said gear and said transmitting member.

23. In a transmission mechanism, a pair of coaxial members each having clutch teeth of one member aligned and substantially contiguous with those of the other member, an axially shiftable member concentric and rotatable independently of either of said pair of members, a clutch member rotatably carried by said shiftable member, but to shift therewith, first and second series clutch teeth of said clutch member respectively for alternate engagement with the clutch teeth of both said pair of coaxial members, said first and second series of clutch teeth being spaced shiftwise such that said clutch member has a neutral land to be normally occupied by the contiguous clutch teeth of said pair of coaxial members, and means for shifting said shiftable member in one direction to bring one of said first and second series clutch teeth of said clutch member into engagement with the clutch teeth of both said coaxial members, or in the other direction to bring the other of said first and second series clutch teeth of said clutch member into engagement with the clutch teeth of both said coaxial members.

24. In a transmission mechanism, a first rotatably mounted member having gears rotatably carried thereby, a second rotatably mounted member having gears rotatably mounted thereby, a first internal gear meshing with the gears carried by said first member, a second internal gear meshing with the gears carried by said second member, two concentric and independently revolvable transmitting shafts, each of said two shafts having a gear non-rotatably fixed thereto, said gear of one of said two shafts meshing with the gears carried by one of said first and said second members, said gear of the other of said two shafts meshing with the gears carried by the other of said first and said second members, said second internal gear and said second member carrying gears and the gears carried by the latter forming an assembly adapted to be shifted axially as a unit, said second gear-carrying member and said first internal gear each having parts to be engaged to positively prevent relative rotation therebetween while said shiftable unit occupies a first position, said first gear-carrying member and said second internal gear each having parts to be engaged to positively prevent relative rotation therebetween while said shiftable unit occupies a second position, said first gear-carrying member and said second gear-carrying member each having parts to be engaged to positively prevent relative rotation therebetween while said shiftable unit occupies a third position, and means to shift said shiftable unit selectively from one to another of said first, second and third positions.

25. In a power transmitting mechanism, a pair of epicyclic gear trains in tandem arrangement, each of said gear trains having an individual internal gear orbital element and an individual driven member respectively carrying planet gear elements thereby that are individual to the respective epicyclic gear train, one-way stop means, individual means operatively connecting the internal gear orbital element of one of the pair of epicyclic gear trains with said one-way stop means, and individual means utilizing the planet gear carrying individual member of said one of the pair of epicyclic gear trains to form means operatively connecting the internal gear orbital element of the other of said pair of epicyclic gear trains with said one-way stop means.

26. In power transmitting mechanism, a rotatably mounted driven member carrying gears rotatable thereby, a driving pinion gear meshing with said rotatably carried gears, an internal gear meshing with said rotatably carried gears, a normally loose driving member coaxial with, and normally rotatable independently of, said pinion gear and said driven member, one of said driven member and said internal gear element associates with the gears carried by said driven member forming a normally relatively rotatable member to, and extending into juxtaposition for direct drive connection with, said normally loose driving member, a clutch element associated with one of said connectable members and rotatable with the other of said connectable members, and means for engaging and disengaging said clutch element whereby said connectable members are coupled together.

27. In a power transmission mechanism, a pinion drive gear, an internal gear, a rotatably mounted member carrying gears rotatable thereby and meshing with both said internal and pinion gears, a stationary member, a pair of one-way brakes engaging said stationary member, means individually connecting said internal gear operatively with one of said one-way brakes, and means individually connecting said gear carrying member operatively with the other of said one-way brakes.

28. In a power transmitting mechanism, a pair of concentric normally relatively rotatable members, clutch teeth on one of said members, clutch teeth on the other of said members but longitudinally spaced with respect to said clutch teeth on said one member, a stationary member, clutch teeth on said stationary member normally reposing longitudinally intermediate of said clutch teeth respectively on one and the other of said pair of members, two one-way brake mechanisms associated with said stationary member, each of said one-way brakes having an individually engageable clutch member provided with clutch teeth, said clutch teeth of said clutch member of one of said one-way brakes normally engaging the clutch teeth of one of said pair of members, said clutch teeth of said clutch member of the other of said two one-way brakes normally engaging said clutch teeth of the other of said pair of members, one of the assemblies, respectively, constituting said stationary and associate one-way brakes, or said pair of relatively rotatable members, adapted to be shifted as a unit, and means for shifting said shiftable unit to disestablish the clutch tooth engagements of said pair of members from said clutch members of said one-way brakes and to alternatively selectively engage the clutch teeth of one of said pair of members with said clutch teeth of said stationary member.

29. In a power transmitting mechanism, the combination of a pair of epicyclic gear trains adapted to be established in series gear drive power transmitting operation; one of said pair of gear trains adapted to be shifted as a unit into one position in which it is established in said gear drive operating series with the other gear train, a rotatably mounted member carrying planet gear elements of said shiftable epicyclic gear train, a stationary member, said stationary member and said gear carrying member each having parts to be engaged to positively prevent relative rotation therebetween, an internal gear of said shiftable epicyclic gear train, said internal gear and said stationary member each having parts to be engaged to positively prevent relative rotation therebetween, and means to shift said shiftable epicyclic gear train, selectively, either out of said one position in one direction to engage said parts of said gear carrying member and said stationary member, or out of said one position in another direction to engage said parts of said internal gear and said stationary member.

30. An automatic change speed transmission including, in combination, driving and driven members and automatically variable transmission means between said driving and driven members, provided with an epicyclic gear train forming means selectively shiftable as a unit to establish the transmission automatically operable, or alternatively, to establish itself either fixed gear drive operative to give a positive low forward speed gear drive to said driven member or fixed gear drive operative to give a positive reverse gear drive to said driven member, and provided with means including a normally engaged but optionally disengageable friction clutch in series, and exclusively cooperative, with said shiftable epicyclic gear train to complete the driving connections of said fixed forward low and reverse gear drives between said driving and driven members through the medium of said shiftable epicyclic gear train.

31. In a power transmitting mechanism including a pair of concentric and independently revolvable driving members and a coaxial driven member for coupling to a load, said driven member carrying a first series of planetary gear elements rotatable thereby, and an independently rotatably mounted member forming an intermediary planetary transmitting member carrying a second series of planet gear elements rotatably thereby; the combination of a large diameter first sun gear individually driven by the inner one of said pair of concentric driving members and meshing with and to drive the first series of planet gear elements respectively carried by said driven member that is for coupling to a load, and a first annulus gear meshing with the same said first series of planet gear elements, said first annulus gear having gear teeth quantitatively relative to the gear tooth quantity of said first sun gear such that said first sun, planet and annulus gears form a low forward speed ratio of reduction drive to said driven member from said first sun gear when the normal retrograde rotative tendencies of said annulus gear are restrained; and a comparatively small diameter second sun gear individually driven by the outer of said pair of concentric driving members and meshing with and to drive said second series of planet gear elements respectively carried by said intermediary planetary transmitting member, and a second annulus gear meshing with the same said second series of planet gear elements, said second annulus gear having a gear teeth quantitatively relative to the gear tooth quantity of said second sun gear such that said second sun, planet and annulus gears form a relatively lower speed ratio of reduction drive to said intermediary planetary member from said second sun gear, when the normal retrograde rotation tendencies of said second annulus gear are restrained, than the respective speed ratio of reduction drive to said driven member by said first sun, planet and annulus gears; said intermediary planetary transmitting member carrying said second series of planet gears normally connected to drive said first annulus gear; and means for individually restraining said retrograde rotative tendencies, respectively, of said first and of said second annulus gears, all forming means whereby the singular gear drive transmission function by said first sun, planet and annulus gears will render a moderately low speed ratio of reduced speed drive to said driven member singularly under the drive of rotative efforts prevailing in said inner one of said pair of concentric driving members only, and whereby augmentative transmission function by said second sun, planet and annulus gears will render a sufficiently lower speed ratio of reduced speed drive to said first annulus gear, under the drive and when rotative efforts also prevail in the outer of said pair of concentric driving members, as to transitionally effect said first sun, planet and annulus gears to raise the speed of their drive to said driven member but maintain same at a sufficiently low speed ratio of reduced speed as will give an appreciable torque multiplication.

32. In a transmission mechanism, in sub-combination, a pair of concentric driving members; a pinion gear rotatable with one and another pinion gear rotatable with the other of said pair of driving members; a first rotatably carried driven member having gears rotatably carried thereby and meshing with said pinion gear of one of said pair of driving members, said first gear carrying driven member adapted to be coupled to a load; a first internal gear meshing with said gears carried by said first driven member; means for preventing retrograde rotation of said internal gear when forward rotative efforts are applied by said one driving member; a second rotatably mounted driven member having gears rotatably carried thereby and meshing with said pinion gear of the other of said pair of driving members; a second internal gear, said second internal gear meshing with said gears carried by said second driven member, said second driven member normally connected rotatable with said first internal gear; means for preventing retrograde rotation of said second internal gear when forward rotative efforts are applied by said other of said pair of driving members; and means for interlocking the entire assembly consisting of said concentric driving members and gears and driven members to rotate as a unit to merely function as a direct drive transmission member.

33. In a transmission mechanism, in sub-combination; two concentric driven members; a first friction clutch associated with said driving member, provided with means including springs acting to normally engage said clutch, provided with means automatically operable in response to a predetermined speed attainment by said driving member to further energize said engagement of said clutch, provided with means for disengaging said clutch over the influences of both said springs and said speed responsive means forming a clutch mechanism normally operative clutching one of said two members to said driving member that may be optionally disengaged, said first clutch adapted to be thrust-motivated as a unit by said speed responsive means operating to further energize engagement of same; retractive means operating to normally but yieldingly restrain said clutch from moving at least appreciably as a unit under the influence of said clutch engaging springs thereto but adapting said clutch to yield as a unit under influence of said speed responsive means when said predetermined speed is reached; and means including a second friction clutch associated with said driving member for coupling the second of said two driven members to said driving member, provided with retractive means operating normally urging said second clutch out of engagement, and said second clutch in close relation with, and adapted to be actuated into engagement by, the speed-responsive automatic-means motivation of said first clutch unit; and a singular system of secondary means automatically operable in response to a predetermined speed of one of said driving and driven members after the engagement of said second clutch forming double acting means, respectively, for individually speed responsively super-energizing the engagement of each the engaged said first clutch and the engaged said second clutch.

34. In a transmission mechanism, in sub-combination, a driving member; three concentric driven members coaxial with said driving member; a first friction clutch element in association with said driving member and provided with means to couple a first of said driven members to rotate with said driving member upon engagement of said first clutch element; a second clutch element associated with said driving member and non-rotatably fixed to a second of said driven members; resilient means normally operating to hold at least one of said first and second clutch elements out of engagement; means automatically operable in response to variations in the speed of said driving member and operable to simultaneously energize engagement of both said one and said second friction elements; means for control by the operator for optionally disengaging at least one of said first and second clutch elements over the influence of said speed responsive automatic means; and an independent centrifugal automatic friction clutch mechanism carried by one of said driving and driven members forming means for coupling the third of said driven members into a clutched unity with said first and said second driven members to rotate with said driving member when said carrying member attains a predetermined speed after the engagement of said first and said second clutch elements.

35. In power transmission mechanism with driving and driven members and a transmitting means train therebetween having individual drive coupling means operable to complete the driving connections of same at certain speed ratio of drive between said members; the combination of planetary gearing operatively connected with said certain speed ratio of drive means and a reaction member operatively connected thereby to manifest retrograde rotative tendencies as a reaction to forward drive rotative efforts under transmission through said certain speed ratio of drive means from said driving member to said driven member and to manifest forward rotative tendencies as a reaction to said forward rotative efforts in said drive reversing to that of transmission toward said driving member from said driven member such as would occur in the event said driving member was decelerated; means cooperable with said reaction member and employing the medium of said planetary gearing for establishing a faster speed ratio of drive between said driving and driven members upon said driving member being momentarily decelerated including a contiguous member with said reaction member and a positive type centrifugal automatic clutch device carried by one of said reaction and contiguous members forming means for coupling said members together when they attain synchronism whereby the driving connections of said faster speed ratio are completed between said driving and driven members; said centrifugal automatic clutch device having means automatically operable to effect its disengagement when same is decelerated to a predetermined speed; means under control of the operator including a normally engaged but optionally disengageable unit of frictionally engaging elements in tandem drive effective series with said centrifugal automatic clutch in said faster speed ratio establishing means forming means disengageable to abnormally disestablish said completed driving connections of said faster speed ratio means between said driving and driven members whereby the engaged centrifugal automatic clutch is rendered free to be decelerated while said driving member is simultaneously accelerated to take the load of said driven member through the medium of said certain speed ratio of drive and whereby said reactive member and the engaged centrifugal automatic clutch thereby rotatable therewith will be caused to manifest its said retrograde rotative tendencies to a decelerating point at which said centrifugal automatic clutch device will disengage and normally revert the drive to said certain speed ratio means, all whereby said faster speed ratio may be established between said driving and driven members by momentarily decelerating said driving member, and conversely, whereby said faster speed ratio drive may be caused to revert to normal, re-establishing said certain speed ratio of drive operative as the normal transmitting medium between said driving and driven members, by simultaneously accelerating said driving member and disengaging said unit of frictionally engaging elements.

36. A power transmission mechanism with driving and driven members, in combination, a variable transmission means between said members for giving four forward and one reverse speed between said members the four forward speeds in an automatically variable range comprising the second, third and fourth speeds and the first and reverse speeds for alternative selection either rendering the three forward speed range neutral;

means including a shiftable mechanism for selectively either establishing the three forward speed range operable, or establishing the first forward speed a fixed gear drive permanently connecting said members or establishing the reverse speed a fixed gear drive permanently connecting said members; in said automatically variable selection automatically operable means for initially coupling said second speed ratio drive operative between said members and automatically operable means for thereafter coupling said third speed ratio drive operative between said members under conditions of continuous acceleration of said driving member and subsequent continuous power flow to drive said driven member during the transition from said second to said third speeds and automatically operable means including a centrifugal automatic clutch device for thereafter coupling said fourth speed ratio drive operative between said members under conditions of momentary deceleration of said driving member and subsequent momentary cessation of power flow to drive said driven member; means including a normally engaged but optionally disengageable friction clutch exclusively related to said fourth speed in the automatically variable selection for disengagement with accompaniment of simultaneous constant acceleration of said driving member whereby said fourth speed, conversely, is automatically operative to disestablish under said conditions of said constant acceleration of said driving member while said friction clutch is momentarily disengaged; and means operating to complete the driving connections of either said first forward speed or reverse, respectively, in either of their selections between said driving and driven members including means whereby said friction clutch is established cooperative exclusively with said first forward or said reverse speed and adapted to be disengaged to facilitate shifting of said shiftable mechanism, respectively, in connection with establishing or disestablishing either said first forward or reverse speeds.

37. In a change speed power transmitting mechanism with driving and driven members, means including a certain speed ratio of drive transmitting means between said members and respectively cooperative friction drive operative coupling means for completing the driving connections of said certain speed ratio means between said members; and means including additional planetary gearing and additional friction drive coupling devices forming means for accumulatively operating and resultant establishing of other relatively faster speed ratios of drive between said members, respectively, whereby the planetary gearing and the friction coupling devices simultaneously operating to transmit the torque of each succeeding speed ratio of drive established between said members will be multiplied and such that each thusly multiplied simultaneous transmission operating coordination of planetary gearing and friction coupling devices will by apportionment to stepped-up pluralities of simultaneously driven operative parallel series power flow lanes reduce the proportion of the torque transmitted respectively by any one of said planetary gearing and respectively by any one of said friction coupling devices.

38. In combination, an automatic change speed transmission with driving and driven members having a first speed ratio transmitting means automatically establishable drive operative between said members in response to a first predetermined speed attainment by said driving members; a second speed ratio transmitting means thereafter automatically establishable drive operative between said members, under conditions of continuous drive from said driving to said driven member, in response to a predetermined speed attainment of an element of said first drive operative transmission embodiment; and a third speed ratio transmitting means thereafter automatically establishable drive operative between said members under conditions of a momentary cessation of drive from said driving to said driven member requiring momentary deceleration of said driving member, and conversely, automatically drive operatively disestablishable between said members to revert the drive to one of said first and second speed ratios of drive therebetween under conditions of abnormal opening of the third speed drive in accompaniment with continuous drive from said driving member to said driven member requiring constant acceleration of said driving member, said third speed means including a centrifugal automatic clutch device whereby third speed is automatically established drive operative between said members when said driven member has attained sufficient speed and when said driving member is momentarily decelerated, and said third speed means including a normally engaged but optionally disengageable friction clutch adapted to be momentarily disengaged, whereby said third speed drive is abnormally opened, while said driving member is under constant acceleration, whereby said centrifugal automatic clutch is permitted to be influenced to disengage by the reactions of the drive resuming in one of said first and second speed ratios of drive between said members, such that thereupon said optionally disengaged friction clutch may be released into normal engagement.

39. In a power transmission mechanism, the combination of a driving member and a driven member mounted for rotation for power to be applied thereto and to be taken therefrom respectively, a train of transmitting means for rotating said driven member from said driving member at low ratio reduced speed relative to the speed of said driving member including a differential planetary gearset only a portion of whose gear elements are complementary of driving connections in said low ratio train between said driving and driven members and a clutch for completing the driving connections of said low ratio train between said members, and means for subsequently establishing a second ratio of speed reducing transmission connections to rotate said driven member from said driving member still at reduced speed relative to the speed of said driving member and whereby an additional portion of the elements of said differential gearset jointly with the full complement of established said low ratio driving connections respectively between said driving and driven members would concurrently drivingly contribute to rotating said driven member from said driving member at said second ratio of speed reducing transmission therebetween and including a second clutch for completing the driving connections of said second ratio between said driving and driven members.

40. In a power transmitting mechanism, the combination of a driving member, a driven member, automatically variable change speed transmission mechanism for rotating said driven member from said driving member under certain different conditions at either slow speed driving ratio speed reduction relative to said driving member, or at faster speed driving ratio speed reduction relative to said driving member, or at substantially direct drive ratio, and means for establishing either, the speed reduction gear drive whose ratio is next under direct drive, or direct drive between said driving member and said driven member whereby a circuit of parallel series multi-power flow lanes will concurrently drivingly function between two members of the variable speed transmission mechanism so as each of said parallel power flow lanes of said circuit may assume transmission of only an apportionment of the torque transmitted between said driving and driven members including a differential planetary gearset and an automatic speed and load controlled slip type drive coupling device and an automatic engaging friction clutch mechanism forming complementary means for giving said circuit of parallel series multi-power flow lanes to serve said speed reduction gear drive whose ratio is next-under-direct drive, and said substantially direct drive establishments.

41. In a power transmission mechanism, a driving member; a driven member; automatically variable change speed transmitting means for initially rotating said driven member from said driving member at low ratio of speed reduction relative to the speed of said driving member including an automatic speed and load controlled drive coupling device for establishing said low ratio between said driving and driven members and associate transmitting means with said coupling device including differential planetary gearing forming means for establishment as a circuit of parallel series multi-lanes for simultaneous power flow by function of said coupling device, whereby an apportionment of the torque transmitted between said driving and driven members through the initially establishable said low ratio will be transmitted singularly by said gearing drivingly in circumvention of said coupling device, and whereby only the balance of said torque transmitted between said driving and driven members at said low ratio may be assumed by said coupling device in establishing the initial driving connections for said driven member to be rotated from said driving member; means for subsequently establishing second ratio of speed reducing driving connections for rotating said driven member from said driving member at reduced speed relative to the speed of said driving member including an automatically engageable friction clutch for establishing said second ratio between said driving and driven members and associate transmitting means with said clutch forming means for establishment as a parallel series train of driving connections to, and for accumulatively drivingly augmenting the full complement of, those driving connections which rendered said low ratio of drive between said driving and driven members, whereby said full complement of said driving connections which rendered said low ratio and including their said drive coupling will retain transmission of an apportionment of the torque transmitted between said driving and driven members contributing to said second ratio of speed reducing drive, and whereby only the balance of the torque transmitted between said driving and driven members at said second ratio drive will constitute the apportionment of the torque which may be assumed by said clutch in establishing said second ratio.

42. In a power transmission, the combination of a driving member, a driven member, a parallel series plurality of planetary gear units adapted to collectively gear drive said driven member and of which plurality two different planetary gear units each have a sun pinion drive gear element respectively of one of said two planetary gear units normally for rotation relative to said sun gear element of the other of said two planetary gear units, and separate means for connecting respectively said sun gear element of one and said sun gear element of the other of said two planetary gear units to be driven by a separate power flow each emanating immediately at said driving member including gear elements constituting still another planetary gear unit embodiment and forming a transmission intermediary complement of the respective of said separate connecting means that is adapted to serve separate power flow from said driving member to said sun drive gear element of one only of said two planetary gear units.

43. In a power transmission, the combination of a driving member and a driven member mounted for rotation for power to be applied thereto and to be taken therefrom respectively; a first establishably adapted speed reduction transmitting train between said members including, a plurality of planetary gear units in series, the final driven planetary gear unit of which comprises planet gears each mounted rotatable on a common carrier and through the latter adapted to drive said driven member, a sun pinion drive gear element meshing with said planet gears and adapted to be driven by drivingly preceding of said series plurality of planetary gear units in the rendering of said first establishable train and an internal gear element meshing with said planet gears and adapted to operate as a reactance gear to said final driven planetary gear unit while the latter is being driven from said driving member solely through the medium of its said sun pinion; an automatic speed and load controlled slip type drive coupling device cooperating with said drivingly preceding of said planetary gear units and forming automatic means for completing the driving connections of said first establishable train drive operative from said driving member through to the sun pinion of said final gear unit; a subsequently establishable sub-transmitting train between driving members from said driving member and individually said internal gear member of said final driven planetary gear unit forming a parallel series transmitting train to the driving connections of said first establishable transmitting train individually serving the sun pinion of said final gear unit and for accumulative driving function, over continued driving function by said first establishable train, whereby to serve dual power flow input in parallel series to said final gear unit thereby to step up the speed of said driven member, said subsequently establishable sub-transmitting train including drivingly preceding of said planetary gear units in series therein whereby to give driving connections individual to said internal gear such that would be rotatable relative to the driving connections individual to the sun gear of said final driven planetary gear unit, and means operable to establish said subsequently establishable sub-transmitting train drive operative from said driving member through to the internal gear of said final driven planetary gear unit drivingly through said preceding of said planetary gear units without molesting a drive operative state of said first establishable transmitting train respectively from said driving member through to said sun gear of said final driven planetary gear unit, including an automatic friction clutch mechanism for establishing said sub-transmitting train operative to drive the internal gear of said final gear unit operable when certain conditions are attained in the mechanism.

44. In a power transmission, a drive member, a driven member automatically variable change speed transmission mechanism for changing the driving ratio between said drive and driven members from a slow to a relatively faster speed including an automatic speed responsive clutch mechanism for establishing said faster driving ratio operable upon a temporary reduction in the speed of the drive member relative to the driven member; in combination with a spring normally engaged friction clutch mechanism adapted to be momentarily disengaged at the will of the operator, and means whereby momentary disengagement of said friction clutch accompanied by sufficient power acceleration of said drive member would automatically attain disengagement of said automatic speed responsive clutch and consequently normally disestablish said faster driving ratio in favor of said slow driving ratio reassuming the driving function between said drive and driven members and whereby said friction clutch may thereupon be allowed to reengage without restoring said faster driving ratio, all under constant torque.

45. In an automatically variable change speed transmission mechanism, in sub-combination, a rotatably mounted driven member for propelling the load, a rear planetary gear unit comprising a sun pinion drive gear and an internal gear and planet pinion gears interconnecting said sun and internal gears and carried on said driven member rotatably mounted thereby, a main transmission shaft exclusively for driving, and therefor connected rotatable with, the sun pinion of said rear gear unit, a front planetary gear unit whose assembly in concentric encirclement of, and whose entire complement of elements, including an individual driven member sleeve-shaped carrier for the planet pinions of said front gear unit, are mounted rotatable relative to, said main transmission shaft, the internal gear of said rear gear unit adapted to be individually rotated from output of said front gear unit drivingly therefrom through a rearwardly extending portion of said sleeve-shaped individual carrier for the planet pinions of said front gear unit whether the elements of said front gear unit are gear functional or locked to rotate as a unit, and clutch mechanism exclusively between a rearwardly extending portion of said sleeve-shaped individual carrier for the planet pinions of said front gear unit and the internal gear of said rear gear unit for establishing and disestablishing the internal gear of said rear gear unit to be individually rotated from the transmission function of said front gear unit whether the latter of gear drive or direct drive coupling.

46. In a power transmission, the combination of a driving member; a driven member; automatically variable change speed transmission mechanism for changing the gear ratio between said driving and driven members from slow speed to faster speed including a rear planetary gear unit comprising a sun pinion drive gear having a main transmission shaft exclusively for driving same and accordingly connected rotatable therewith and an internal gear and planet pinion gears interconnecting said sun and internal gears and carried on said driven member rotatably mounted thereby, a front planetary gear unit whose assembly in concentric encirclement, and whose entire complement of elements including an individual driven member therefrom carrying the planet pinion gears thereof being mounted for rotation relative to, said main transmission shaft and said connected sun pinion of the rear gear unit, forming automatically variable transmission mechanism for giving said slow speed ratio by inputting only single power flow to said rear gear unit and that drivingly through its said sun pinion, forming automatically variable transmission mechanism for changing the gear ratio aforesaid from said slow speed to said faster speed by accumulatively inaugurating a second power input to said rear gear unit and that drivingly through its said internal gear directly from said planet carrier individual driven member of said front gear unit and whereby under the dual power input to establish said rear gear unit differential gear functional between said dual power input thereto, and including a clutch mechanism exclusively between said planet carrier individual driven member of said front gear unit and the internal gear of said rear gear unit through which clutch for said accumulative second power input to said rear gear unit to constitute a direct drive connection between output of said front gear unit and the internal gear of said rear gear unit whereby to short circuit with independently rotatable transmission connection the transmission connection of said main transmission shaft to said rear gear unit.

47. In a power transmitting mechanism, in sub-combination, a main transmission shaft; a rear planetary gear unit including a sun pinion drive gear, forming the sole member to be directly driven by said main transmission shaft and accordingly connected rotatable therewith, and an internal gear and planet pinion gears interconnecting said sun and internal gears; a front planetary gear unit whose assembly in encirclement of, and whose entire complement of elements including a sleeve-shaped individual driven member therefrom and carrying the planet pinions of said front gear unit rotatably mounted thereby being mounted rotatable relative to, said main transmission shaft and said connected sun pinion of the rear gear unit, the power output from said front gear unit, exclusively flowing rearwardly therefrom through its said sleeve-shaped individual driven member planet carrier, for driving the internal gear of said rear gear unit whereby a direct drive connection between said front and rear gear units would leave the elements of said rear gear unit differential gear operative; clutch mechanism exclusively between and for establishing and disestablishing the planet carrier individual driven member of said front gear unit in connection to direct drive the internal gear of said rear gear unit whereby to leave said main transmission shaft and said connected sun pinion of the rear gear unit rotatable relative to all elements of said front gear unit; and means operable to directly drive couple an element of the assembly of said front gear unit with said main transmission shaft including automatic speed and load controlled slip type coupling means one of whose coupling elements is connected rotatable with said main transmission shaft.

48. In a power transmitting mechanism, in sub-combination, a main transmission shaft, a sleeve-shaped transmission shaft concentric and rotatable relative to said main transmission shaft, an internal gear type rear planetary gear unit directly associated with said main transmission shaft, an automatic speed and load controlled slip type drive coupling device directly associated with said main transmission shaft, a front planetary gear unit whose assembly in concentricity to portions of both said sleeve and said main transmission shafts, said front planetary gear unit directly associated with said sleeve shaft and only indirectly associable with said main transmission shaft either at the front through the tandem mediums of said sleeve shaft and thence through the medium of said speed and load controlled coupling device or at the rear through the medium of the gear train of said rear gear unit, and a clutch mechanism exclusively between the carrier for the planetary gears of said front gear unit and the internal gear of said rear gear unit and through which clutch exclusively said front gear unit being drivingly associable and disassociable with said rear gear unit, other than through the intermediary medium of said speed and load controlled coupling.

EVERETT R. BURTNETT.